United States Patent
Kamii et al.

(10) Patent No.: US 9,521,229 B2
(45) Date of Patent: Dec. 13, 2016

(54) MOBILE TERMINAL DEVICE, NON-TRANSITORY COMPUTER READABLE STORAGE MEDIUM, AND CONTROL METHOD FOR MOBILE TERMINAL DEVICE

(71) Applicant: KYOCERA Corporation, Kyoto-shi, Kyoto (JP)

(72) Inventors: Toshihiro Kamii, Osaka (JP); Hideo Okumura, Yao (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/670,206

(22) Filed: Mar. 26, 2015

(65) Prior Publication Data

US 2015/0201056 A1     Jul. 16, 2015

Related U.S. Application Data

(63) Continuation of application No. PCT/JP2013/074025, filed on Sep. 6, 2013.

(30) Foreign Application Priority Data

Sep. 26, 2012   (JP) ................................. 2012-212923

(51) Int. Cl.
  *H04B 1/38*     (2015.01)
  *H04M 1/00*     (2006.01)
  (Continued)

(52) U.S. Cl.
  CPC ... *H04M 1/27455* (2013.01); *H04M 1/274508* (2013.01); *H04M 1/274533* (2013.01); *H04M 1/72583* (2013.01); *H04M 2250/22* (2013.01)

(58) Field of Classification Search
  CPC .................................................. H04M 1/27455
  (Continued)

(56) References Cited

U.S. PATENT DOCUMENTS 6,879,846 B1      4/2005  Miyata
8,676,273 B1 *    3/2014  Fujisaki .............. H04M 1/6505
                                                      379/142.06
(Continued)

FOREIGN PATENT DOCUMENTS

JP      H09-083630 A      3/1997
JP      2000-209324 A     7/2000
(Continued)

OTHER PUBLICATIONS

Written Opinion of the International Searching Authority issued by Japan Patent Office for International Application PCT/JP2013/074025.

(Continued)

*Primary Examiner* — Tilahun B Gesesse
(74) *Attorney, Agent, or Firm* — Procopio Cory Hargreaves and Savitch LLP

(57) ABSTRACT

A mobile terminal and methods are disclosed. A storage module stores at least first contact information including a first phone number and second contact information including a second phone number. A control module causes the display module to display a first image associated with the first phone number and a second image not associated with the phone number stored in the storage module, makes a call at the first phone number, if a first operation for selecting the first image is accepted, causes the display module to display at least the second contact information, if a second operation for selecting the second image is accepted, and causes the display module to display a third image associated with the second phone number instead of the second image, if a third (Continued)

operation for selecting the second contact information is accepted.

14 Claims, 28 Drawing Sheets

(51) Int. Cl.
*H04M 1/2745* (2006.01)
*H04M 1/725* (2006.01)

(58) Field of Classification Search
USPC .............................. 455/566, 567, 564, 557
See application file for complete search history.

(56) References Cited

U.S. PATENT DOCUMENTS

| | | | |
|---|---|---|---|
| 2003/0151283 A1* | 8/2003 | Pogue | B62B 9/26 297/250.1 |
| 2005/0020318 A1* | 1/2005 | Yomoda | H04M 1/72547 455/566 |
| 2005/0113145 A1* | 5/2005 | Chon | H04M 1/0214 455/566 |
| 2005/0181774 A1 | 8/2005 | Miyata | |
| 2006/0176500 A1* | 8/2006 | Hosoi | H04M 1/0212 358/1.14 |
| 2008/0049192 A1* | 2/2008 | Nozaki | G03B 17/00 353/25 |
| 2008/0242363 A1* | 10/2008 | Onda | G06Q 10/109 455/566 |
| 2009/0228820 A1 | 9/2009 | Kim et al. | |

FOREIGN PATENT DOCUMENTS

| | | |
|---|---|---|
| JP | 2007-329881 A | 12/2007 |
| JP | 2008-141519 A | 6/2008 |
| JP | 2009-217815 A | 9/2009 |
| JP | 2010-063172 A | 3/2010 |
| JP | 2011-160375 A | 8/2011 |

OTHER PUBLICATIONS

International Search Report dated Dec. 10, 2013, issued for International Application No. PCT/JP2013-074025.

* cited by examiner

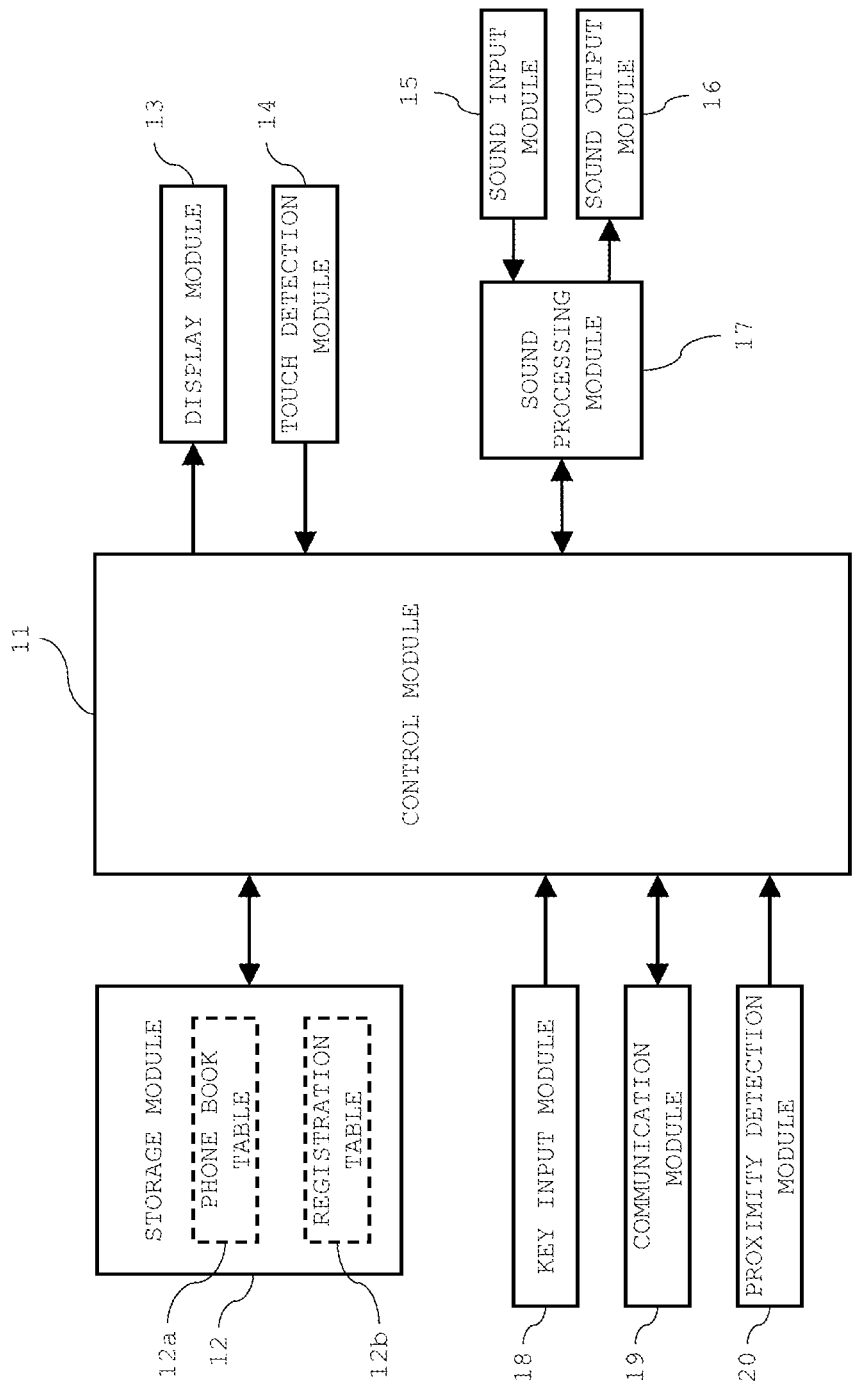

FIG. 3

PHONE BOOK TABLE

| REGISTRATION NUMBER | NAME | PHONE NUMBER | EMAIL ADDRESS | ADDRESS | IMAGE |
|---|---|---|---|---|---|
| 001 | NAME1 | XXX-XXXX-XXXX | **@*.* | ****** | * |
| 002 | NAME2 | XXX-XXXX-XXXX | **@*.* | ****** | * |
| 003 | NAME3 | XXX-XXXX-XXXX | **@*.* | ****** | * |
| 004 | NAME4 | XXX-XXXX-XXXX | **@*.* | ****** | * |
| 005 | NAME5 | XXX-XXXX-XXXX | | ******** | |
| 006 | NAME6 | XXX-XXXX-XXXX | | | |
| ...... | ...... | ...... | ...... | ...... | ...... |

PHONE BOOK INFORMATION

12a

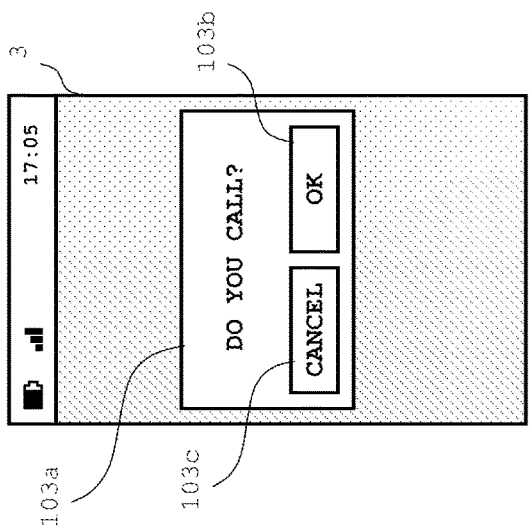
FIG. 5A  PHONE NUMBER ENTRY SCREEN
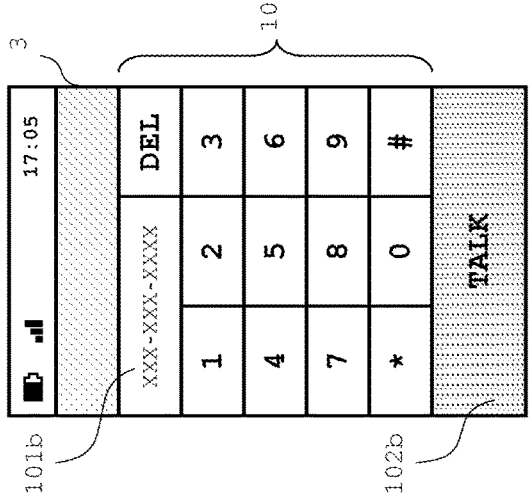
FIG. 5B  PHONE NUMBER ENTRY SCREEN
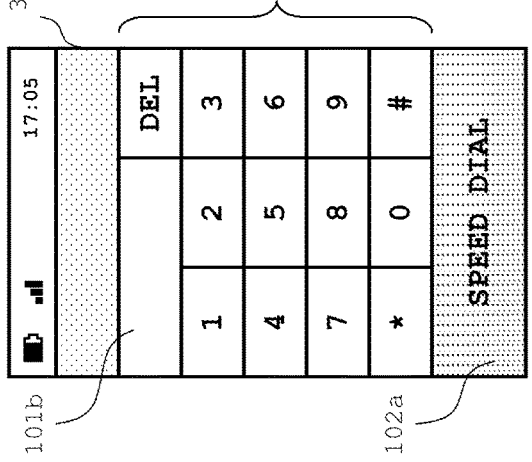
FIG. 5C  CONFIRMATION SCREEN

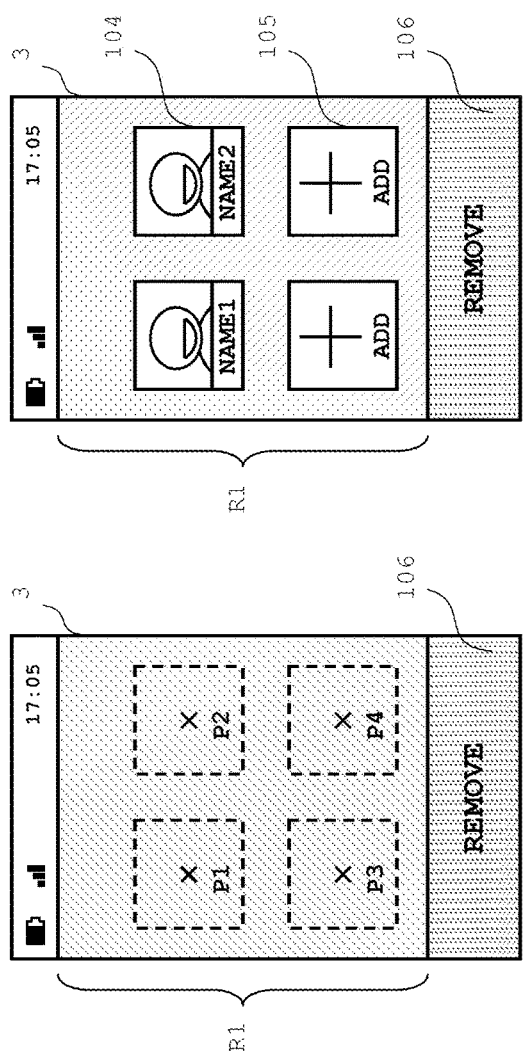

CALLING SCREEN

SPEED DIALING SCREEN

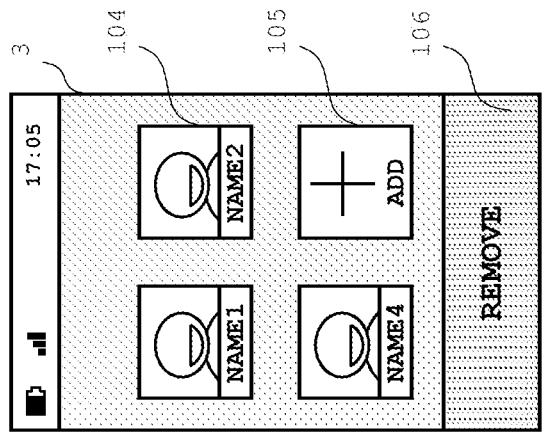
FIG. 10A SPEED DIALING SCREEN
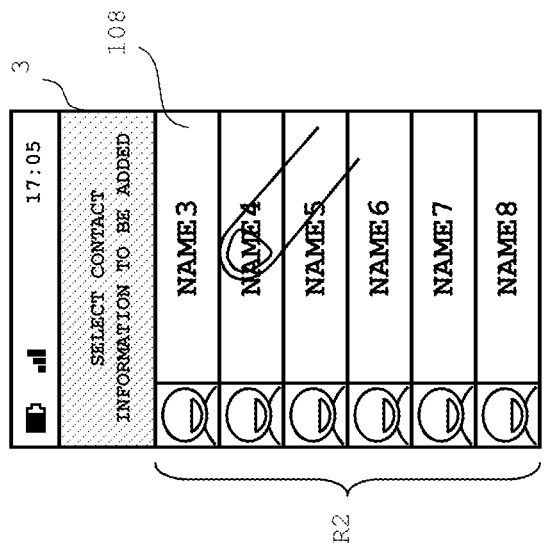
FIG. 10B LIST SCREEN
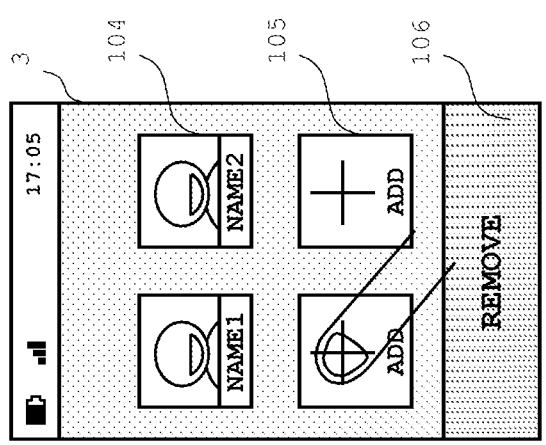
FIG. 10C SPEED DIALING SCREEN

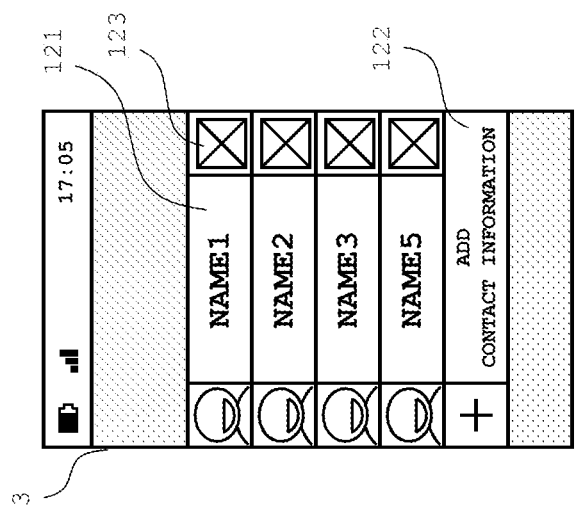
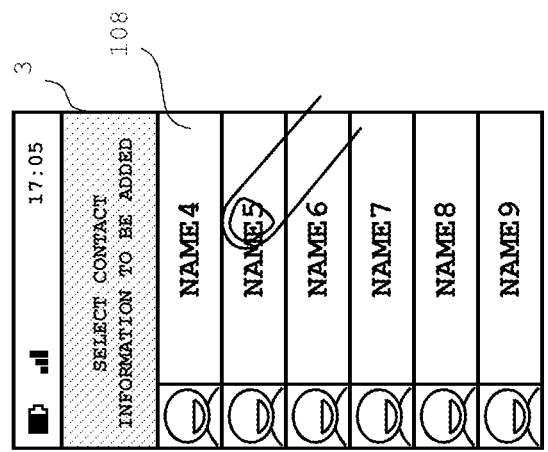
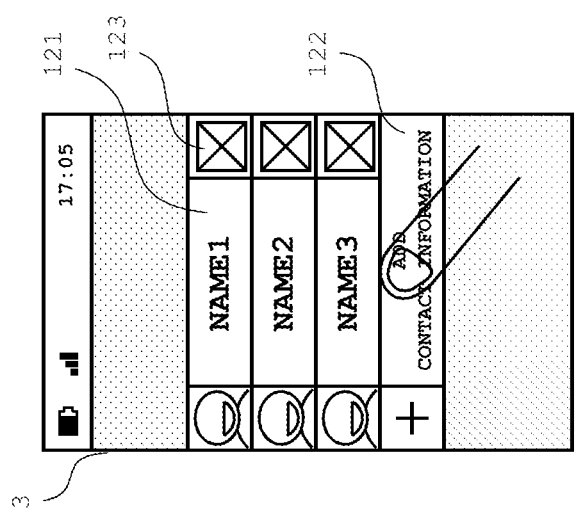

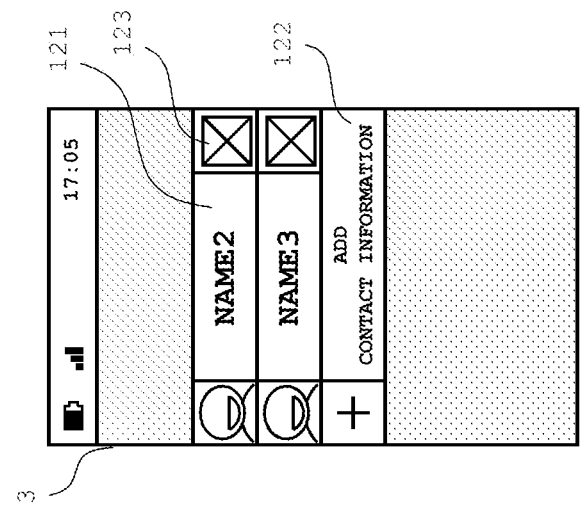
FIG. 15A SPEED DIALING SCREEN
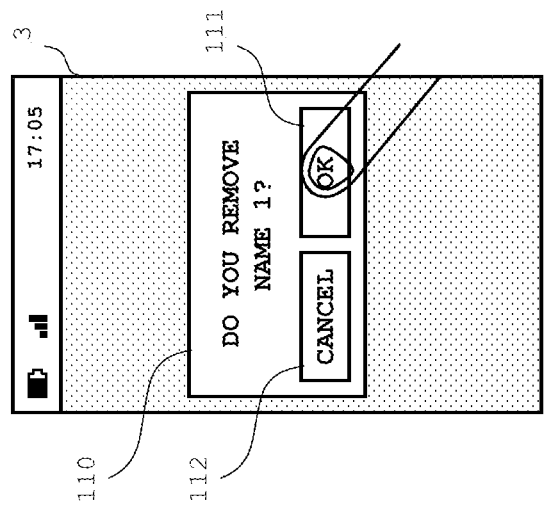
FIG. 15B CONFIRMATION SCREEN
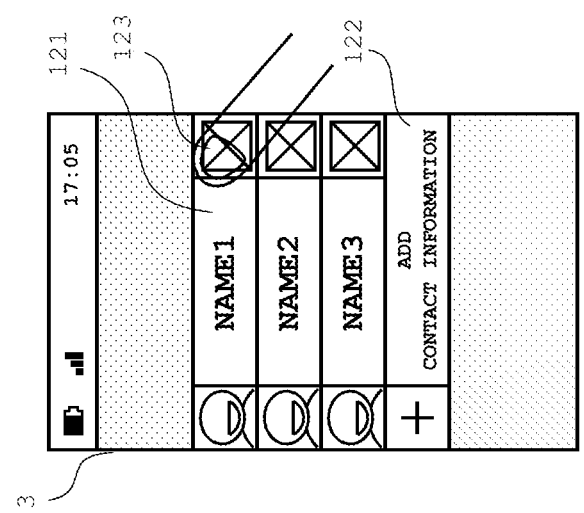
FIG. 15C SPEED DIALING SCREEN

FIG. 16

IMAGE TABLE

| GENDER | | AGE | | | | | | |
| --- | --- | --- | --- | --- | --- | --- | --- | --- |
| | | UNDER 10 | 10'S | 20'S | 30'S | 40'S | OVER 50 | UNCERTAIN |
| | MALE | A | B | C | D | E | F | G |
| | FEMALE | H | I | J | K | L | M | N |
| | UNCERTAIN | | | | X | | | |

12c

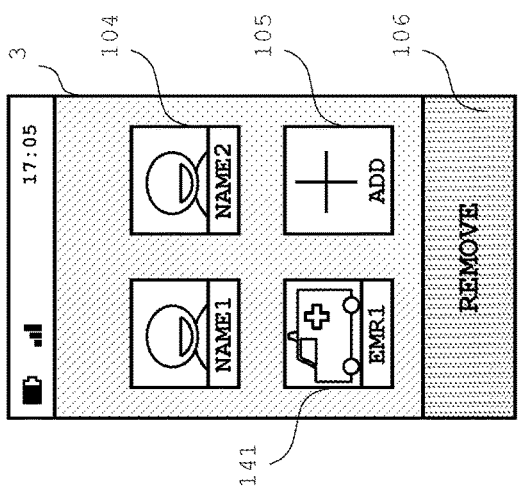
FIG. 18A EMERGENCY CONTACT TABLE
FIG. 18B LIST SCREEN
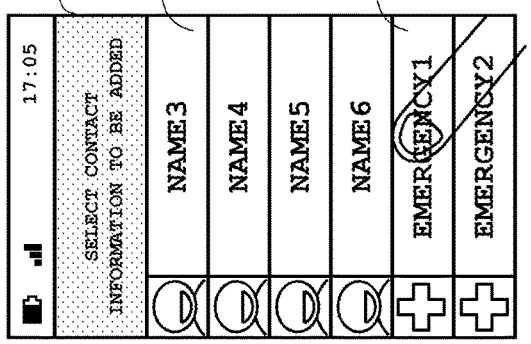
FIG. 18C SPEED DIALING SCREEN

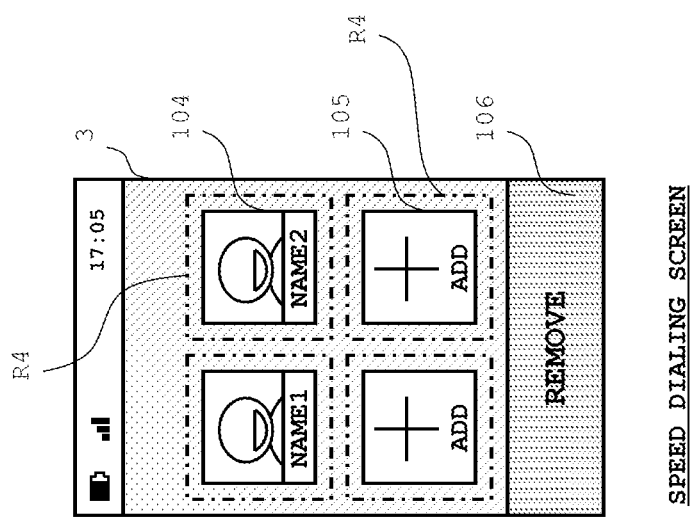

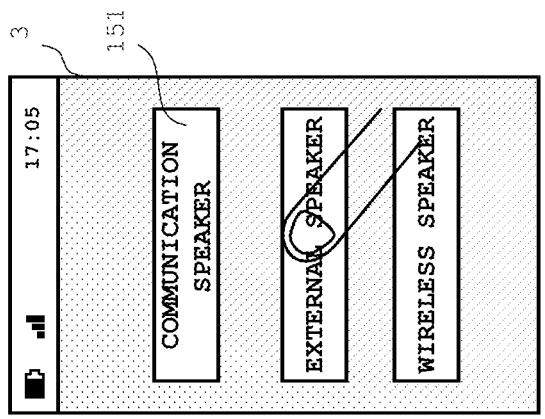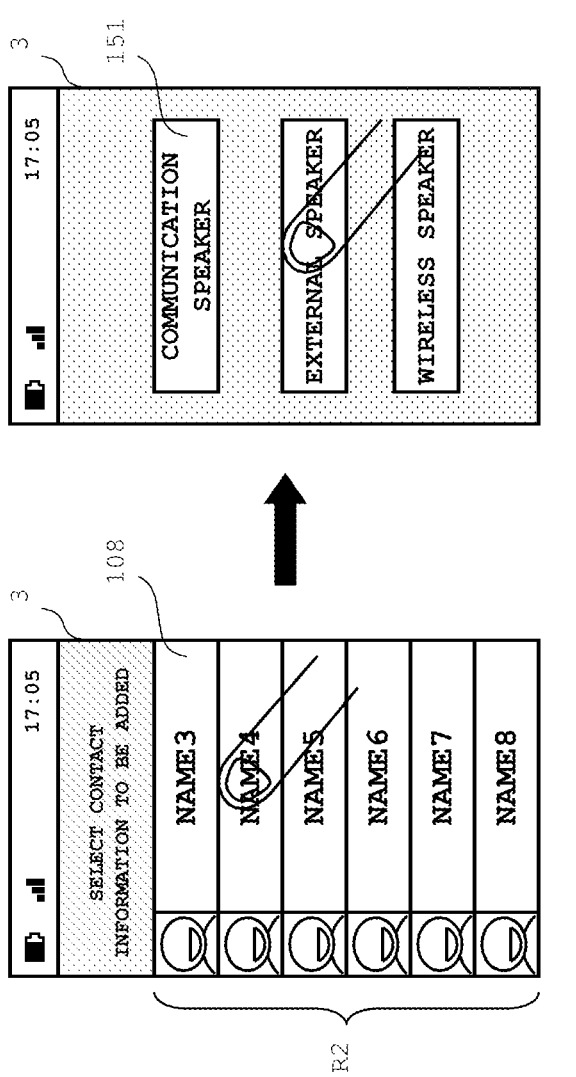

MOBILE TERMINAL DEVICE, NON-TRANSITORY COMPUTER READABLE STORAGE MEDIUM, AND CONTROL METHOD FOR MOBILE TERMINAL DEVICE

The present application is a bypass continuation of international application PCT Application No. PCT/JP2013/074025, filed Sep. 6, 2013, entitled "PORTABLE TERMINAL DEVICE AND CONTROL METHOD FOR PORTABLE TERMINAL DEVICE", which claims priority under 35 U.S.C. Section 119 of Japanese Patent Application No. 2012-212923 filed Sep. 26, 2012, entitled "MOBILE TERMINAL DEVICE, PROGRAM AND METHOD FOR CONTROLLING MOBILE TERMINAL DEVICE". The disclosure of the above applications are incorporated herein by reference.

FIELD

Embodiments disclosed herein relate to mobile terminal devices such as a mobile phone, a PDA (Personal Digital Assistant), a tablet PC, and an electronic book terminal. Embodiments disclosed herein also relate to non-transitory computer readable storage medium suitable for use in the communication devices and a control method suitable for use in the mobile terminal devices.

BACKGROUND

Conventionally, there is known a mobile phone with a function called abbreviated dialing or speed dialing to simplify an operation of making a call to persons whom a user makes a call at high frequencies. For example, such a mobile phone may be configured such that an image associated with the phone number of a communication partner is displayed on a display module, and when a touch operation is performed with respect to the displayed image, a call is made to the communication partner (phone) at the phone number associated with the image. The displayed image may be related to the communication partner.

SUMMARY

A mobile terminal and methods are disclosed. A storage module stores at least first contact information including a first phone number and second contact information including a second phone number. A display module has a display surface. An operation acceptance module accepts an operation with respect to the display surface. A control module causes the display module to display a first image associated with the first phone number and a second image not associated with the phone number stored in the storage module, makes a call at the first phone number, if a first operation for selecting the first image is accepted, causes the display module to display at least the second contact information, if a second operation for selecting the second image is accepted, and causes the display module to display a third image associated with the second phone number instead of the second image, if a third operation for selecting the second contact information is accepted.

In one embodiment, a method for controlling a mobile terminal comprising a storage module configured to store at least first contact information including a first phone number and second contact information including a second phone number, a display module having a display surface and an operation acceptance module configured to accept an operation with respect to the display surface causes the display module to display a first image associated with the first phone number and a second image not associated with the phone number stored in the storage module. The method then makes a call at the first phone number, if a first operation for selecting the first image is accepted. The method then causes the display module to display at least the second contact information, if a second operation for selecting the second image is accepted. The method then causes the display module to display a third image associated with the second phone number instead of the second image, if a third operation for selecting the second contact information is accepted.

BRIEF DESCRIPTION OF THE DRAWINGS

FIG. 2 is an illustration of a block diagram illustrating the entire configuration of the mobile phone in the embodiment;

FIG. 3 is an illustration of a diagram illustrating a configuration of a phone book table in the embodiment;

FIGS. 5A to 5C are illustrations of diagrams illustrating screen transition on a display surface when a call is made by entering a phone number in the embodiment;

FIGS. 8A to 8C are illustrations of diagrams for describing a speed dialing screen in the embodiment;

FIGS. 10A to 10C are illustrations of diagrams illustrating screen transition on the display surface when a registration operation is performed in the embodiment;

FIGS. 13A to 13C are illustrations of diagrams illustrating screen transition on the display surface when a registration operation is performed in the modification example 1;

FIGS. 15A to 15C are illustrations of diagrams illustrating screen transition on the display surface when a removal operation is performed in the modification example 1;

FIG. 16 is an illustration of a diagram illustrating a configuration of an image table in a modification example 2;

FIGS. 18A to 18C are illustrations of diagrams for describing a control process in a speed dialing function in a modification example 3;

FIG. 27 is an illustration of a diagram illustrating a speed dialing screen in another modification example; and FIGS. 28A and 28B are illustrations of diagrams illustrating output destination selection screens in another modification example.

Figure 1B:
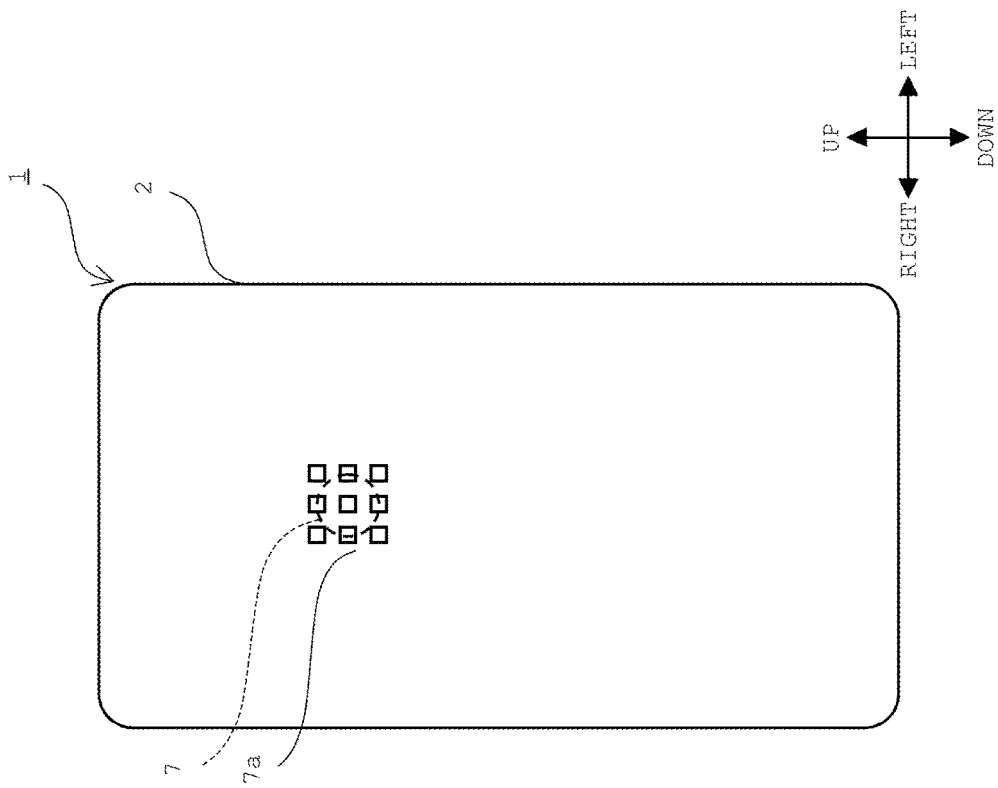
FIG. 1A and FIG. 1B are illustrations of diagrams illustrating a configuration of a mobile phone according to an embodiment of the disclosure.

The drawings are provided mainly for describing the present disclosure, and do not limit the scope of the present disclosure.

DESCRIPTION OF PREFERRED EMBODIMENTS

In the following, an embodiment of the disclosure is described referring to the drawings.

Figure 1A:
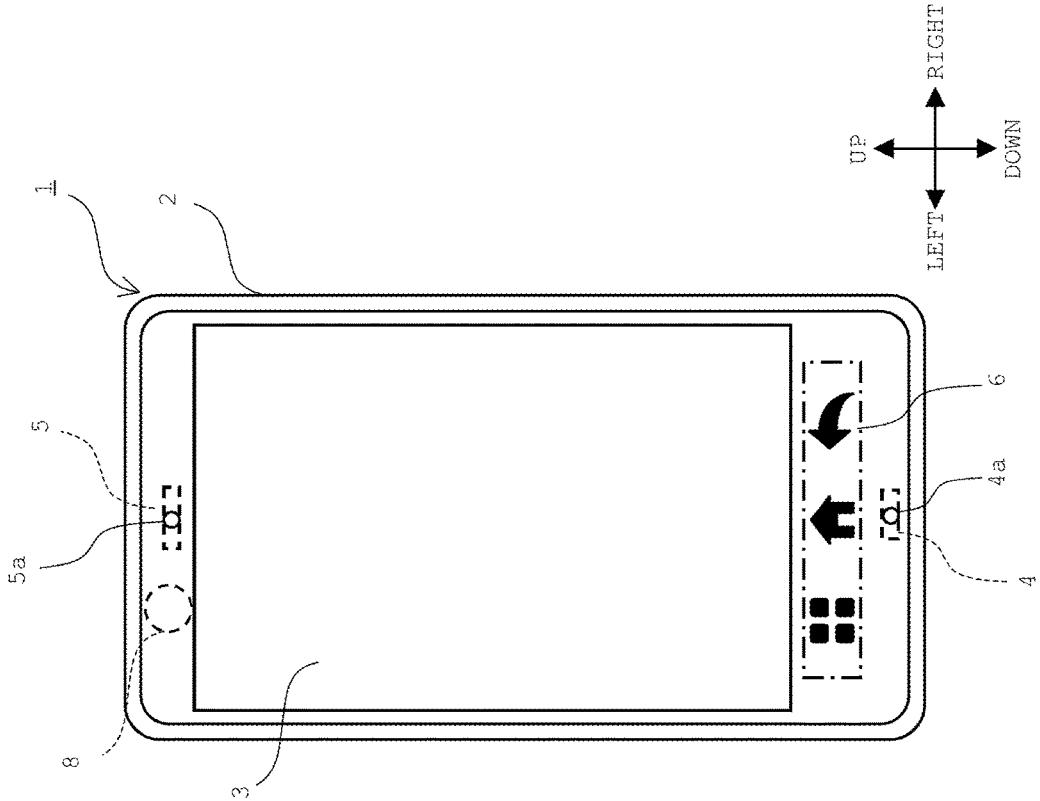

FIG. 1A and FIG. 1B are illustrations of diagrams illustrating a configuration of a mobile phone 1. FIG. 1A and FIG. 1B are respectively a front view and a rear view of the mobile phone 1.

In the following, to simplify the description, as illustrated in FIGS. 1A and 1B, the long side direction of a cabinet 2 is defined as up and down directions, and the short side direction of the cabinet 2 is defined as left and right directions.

The mobile phone 1 includes the cabinet 2, a display surface 3, a microphone 4, a call speaker 5, a key operation part 6, an external speaker 7, and a proximity sensor 8.

The cabinet 2 has a substantially rectangular contour when viewed from the front side. The display surface 3 of a display module 13 to be described later is disposed on the front surface of the cabinet 2. Various images (screens) are displayed on the display surface 3.

The microphone 4 is disposed at a lower end within the cabinet 2, and the call speaker 5 is disposed at an upper end within the cabinet 2. Sound is input into the microphone 4 through a microphone hole 4a formed in the front surface of the cabinet 2. The microphone 4 generates an electrical signal in accordance with input sound. Sound is output from the call speaker 5. Sound output from the call speaker 5 is released to the outside through an output hole 5a formed in the front surface of the cabinet 2.

The key operation part 6 is disposed on the front surface of the cabinet 2. The key operation part 6 is constituted of a plurality of operation keys. Various functions for operating a program being executed are assigned to the operation keys.

The external speaker 7 is disposed in the cabinet 2. Output holes 7a associated with the external speaker 7 are formed in the back surface of the cabinet 2. Sound (voice, alarm, or the like) output from the external speaker 7 is released to the outside through the output holes 7a.

The proximity sensor 8 is arranged next to the call speaker 5. The proximity sensor 8 is a capacitance proximity sensor, for example. When an object (a user's ear or the like) is approximated to the proximity sensor 8, the capacitance of the proximity sensor 8 increases. When the capacitance exceeds a threshold value, the proximity sensor 8 outputs a detection signal. The proximity sensor 8 is not limited to a capacitance proximity sensor but may be an ultrasonic or inductive proximity sensor, for example.

FIG. 2 is an illustration of a block diagram illustrating the entire configuration of the mobile phone 1. The mobile phone 1 includes a control module 11, a storage module 12, the display module 13, a touch detection module 14, a sound input module 15, a sound output module 16, a sound processing module 17, a key input module 18, a communication module 19, and a proximity detection module 20.

The storage module 12 includes an ROM, an RAM, an external memory, and the like. The storage module 12 stores therein various programs. The programs stored in the storage module 12 include, in addition to a control program for controlling the modules of the mobile phone 1, various applications (e.g. applications relating to a phone, an email, a phone book, a map, a game, and a schedule management). The programs may be stored in the storage module 12 when the mobile phone 1 is manufactured by the manufacturer, or may be stored in the storage module 12 by the user via a communication network or a storage medium.

The storage module 12 also includes a working area, which is not illustrated in FIG. 2, in which data to be temporarily used or generated is stored when a program is executed.

The storage module 12 stores a phone book table 12a illustrated in FIG. 3. The phone book table 12a has contact information of communication partners registered therein. The contact information includes contact information related to the communication partners such as names, phone numbers, email addresses, and addresses, and other information related to the communication partners such as images related to the communication partners, and the birthdays of the communication partners and hobbies of the communication partners. Each of the contact information is given a registration number.

The user executes an application for the phone book and uses a predetermined registration screen to enter contact information of each communication partner. The entered contact information is registered in the phone book table 12a. Of information items constituting the contact information, the item not entered by the user is not registered in the phone book table 12a. For example, when no phone number is entered, no phone number is registered in the phone book table 12a. The contact information registered in the phone book table 12a, in particular the phone number, is used in a speed dialing function described later.

The storage module 12 further stores a registration table 12b for use in the speed dialing function. The registration table 12b will be described later.

The control module 11 includes a CPU and the like. The control module 11 controls the modules constituting the mobile phone 1 (such as the storage module 12, the display module 13, the touch detection module 14, the sound input module 15, the sound output module 16, the sound processing module 17, the key input module 18, the communication module 19, and the proximity detection module 20) in accordance with a program.

The display module 13 includes a liquid crystal display and the like. The display module 13 displays an image (a screen) on the display surface 3, based on a control signal and an image signal from the control module 11. The display module 13 may include the display device such as an organic EL display, in place of a liquid crystal display.

The touch detection module 14 includes a touch panel configured to detect touch of the display surface 3 by the fingertip. The touch panel is formed of a transparent sheet-like member, and is disposed on the front surface of the cabinet 2 while covering the display surface 3. The touch panel may be any one of various types of touch panels such as an electrostatic capacitive touch panel, an ultrasonic touch panel, a pressure sensitive touch panel, a resistive touch panel, and a photosensitive touch panel.

The touch detection module 14 receives a user's touch operation with respect to the display surface 3. Specifically, the touch detection module 14 detects a position on the display surface 3 where the fingertip has touched as a touch position, and outputs a position signal in accordance with the detected touch position to the control module 11.

The user is allowed to perform various touch operations by touching the display surface 3 by the fingertip. Examples of the touch operations are a tap operation, a flick operation, a slide operation, and a long-tap operation. The tap operation is an operation of touching the display surface 3 by the fingertip, and then releasing the fingertip from the display surface 3 within a short time. The flick operation is an operation of flipping the display surface 3 in an arbitrary direction with the fingertip. The slide operation is an operation of moving the fingertip on the display surface 3 in an arbitrary direction while keeping the fingertip in contact with the display surface 3. The flick operation and the slide operation are touch operations accompanying movement of a touch position. The long-tap operation is an operation of touching the display surface 3 by the fingertip, holding the touch for a while, and then releasing the fingertip from the display surface 3.

The touch operations are described in detail. For instance, after a touch position with respect to the display surface 3 is detected by the touch detection module 14, when the touch position cannot be detected anymore within a predetermined first time, the control module 11 determines that a tap operation has been performed. After a touch position with respect to the display surface 3 is detected by the touch detection module 14 and the touch position is moved by a predetermined first distance or more within a predetermined second time, when the touch position cannot be detected any more, the control module 11 determines that a flick operation has been performed. After a touch position with respect to the display surface 3 is detected by the touch detection module 14, when the touch position is moved by a predetermined second distance or more, the control module 11 determines that a slide operation has been performed. After a touch position with respect to the display surface 3 is detected by the touch detection module 14, when the touch position is continuously detected for a predetermined third time or more and then the touch position cannot be detected any more, the control module determines that a long-tap operation has been performed.

The sound input module 15 includes the microphone 4 and the like. The sound input module 15 outputs an electrical signal from the microphone 4 to the sound processing module 17.

The sound output module 16 includes the call speaker 5 and the external speaker 7. The sound output module 16 receives an electrical signal from the sound processing module 17, and outputs sound (voice, alarm, or the like) from the call speaker 5 or from the external speaker 7.

The sound processing module 17 performs e.g. A/D conversion to an electrical signal from the sound input module 15, and outputs a digital sound signal which has undergone A/D conversion to the control module 11. The sound processing module 17 performs e.g. a decoding process and D/A conversion to the digital sound signal output from the control module 11, and outputs an electrical signal which has undergone D/A conversion to the sound output module 16.

The key input module 18 outputs, to the control module 11, a signal associated with each one of the operation keys when the operation keys in the key operation part 6 are pressed.

The communication module 19 includes a circuit for converting a signal, and an antenna for transmitting and receiving a radio wave in order to make a phone call or to perform communication. The communication module 19 converts a signal to be input from the control module 11 for a phone call or for communication into a wireless signal, and transmits the converted wireless signal to a communication destination such as a base station or another communication device via the antenna. Further, the communication module 19 converts the wireless signal received via the antenna into a signal of a format usable by the control module 11, and outputs the converted signal to the control module 11.

The proximity detection module 20 includes the proximity sensor 8 and others. The proximity detection module 20 outputs a detection signal from the proximity sensor 8 to the control module 11.

The mobile phone 1 in the embodiment includes a speed dialing function as one of phone applications. The speed dialing function enables simplification of a calling operation for a registered phone number.

To make a phone call, the user activates a phone application. The control module 11 executes a control process for making a phone call to a communication partner.

Figure 4:
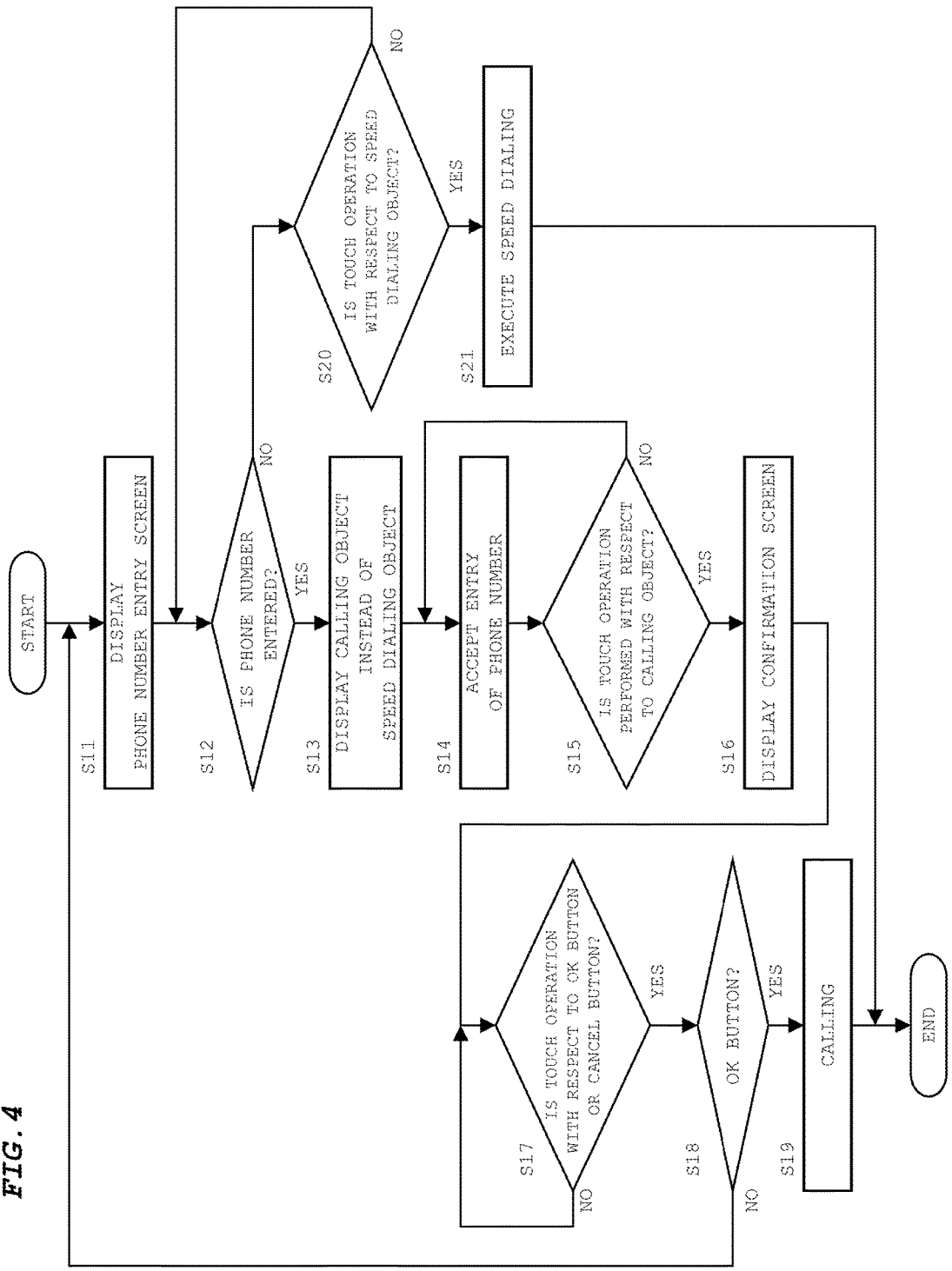
FIG. 4 is an illustration of a flowchart of a control process for making a call in the embodiment.

FIG. 4 is an illustration of a flowchart of a control process for making a call. FIGS. 5A to 5C are illustrations of diagrams illustrating screen transition on the display surface 3 when a call is made by entering a phone number.

On the start of the process, the control module 11 displays a phone number entry screen on the display surface 3 (S11). As illustrated in FIG. 5A, the phone number entry screen includes numeric keypad 101a for entering a phone number and a display window 101b displaying the entered phone number. The phone number entry screen also includes a speed dialing object 102a for executing speed dialing function.

To enter directly a phone number, the user performs a touch operation with respect to the numeric keypad 101a.

When the user performs a touch operation with respect to the numeric keypad 101a for direct entry of a phone number (S12: YES), the control module 11 displays a calling object 102b instead of the speed dialing object 102a on the phone number entry screen as illustrated in FIG. 5B (S13). The control module 11 accepts the entry of the phone number (S14) and determines whether a touch operation has been performed with respect to the calling object 102b (S15).

When the user completes the entry of the phone number and performs a touch operation with respect to the calling object 102b (S15: YES), the control module 11 displays a confirmation screen on the display surface 3 as illustrated in FIG. 5C (S16). The confirmation screen includes a confirmation window 103a for prompting the user to perform an operation to confirm making a call to the entered phone number. The confirmation window 103a includes an OK button 103b and a cancel button 103c.

When determining that a touch operation has been performed with respect to the OK button 103b (S17: YES and S18: YES), the control module 11 makes a call to the communication partner at the entered phone number (S19). Meanwhile, when determining that a touch operation has been performed with respect to the cancel button 103c (S17: YES and S18: NO), the control module 11 returns the display on the display surface 3 from the confirmation screen to the phone number entry screen (S11). As illustrated in FIG. 5A, the speed dialing object 102a, instead of the calling object 102b, is displayed on the phone number entry screen.

When a touch operation has been performed with respect to the speed dialing object 102a before the entry of the phone number is started (S20: YES), the control module 11 executes speed dialing function (S21). As described later, a speed dialing screen, instead of the phone number entry screen, is displayed on the display surface 3.

Figure 6:
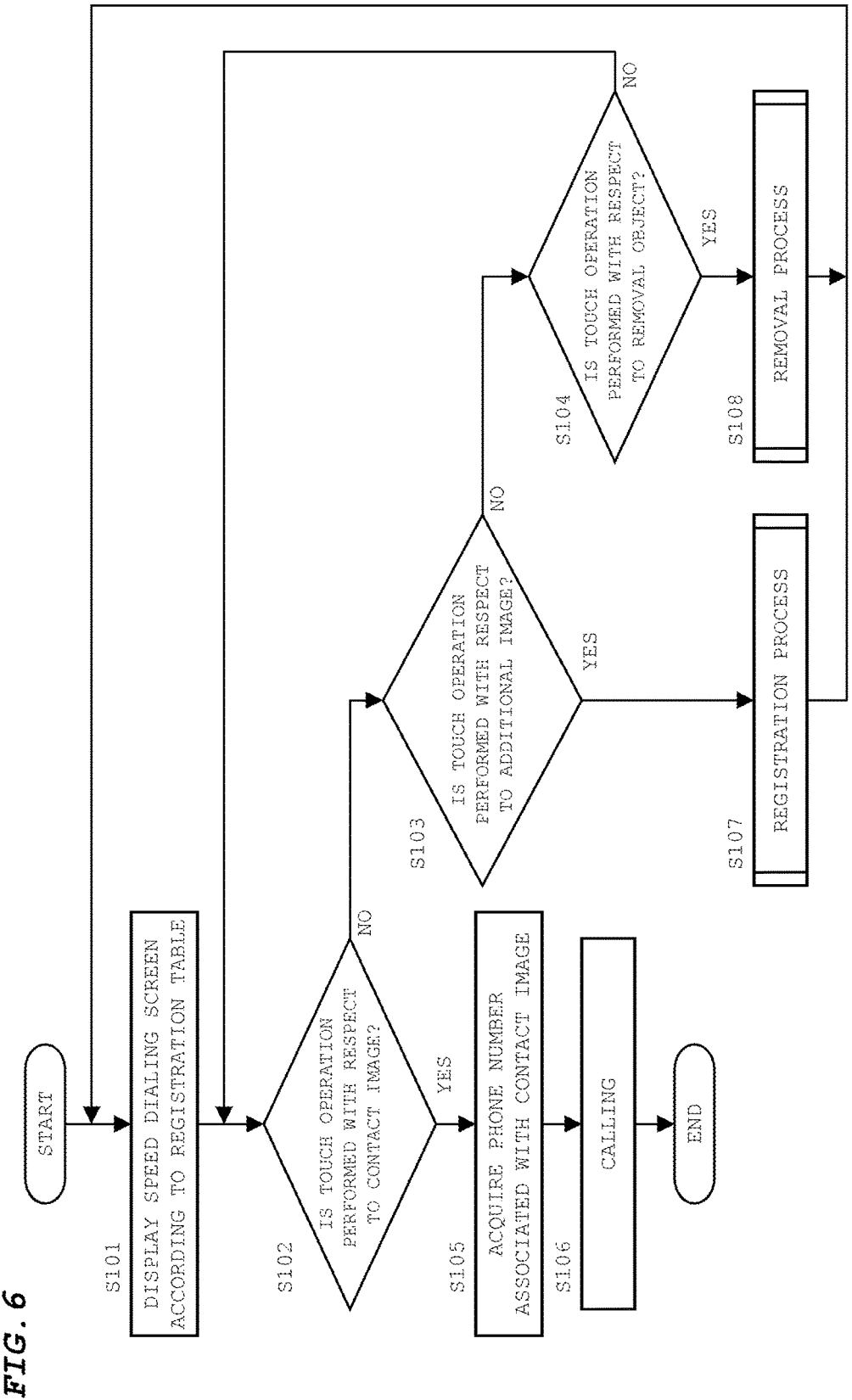
FIG. 6 is an illustration of a flowchart of control processes for a speed dialing function in the embodiment.
Figure 7B:
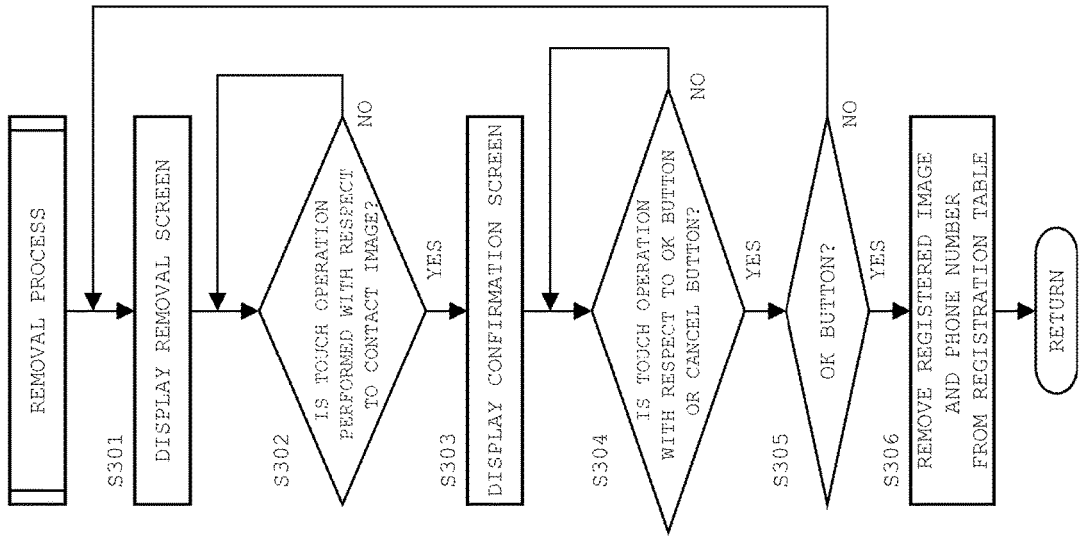
FIGS. 7A and 7B are illustrations of flowcharts of a registration process and a removal process included in the control processes for the speed dialing function in the embodiment.
Figure 7A:
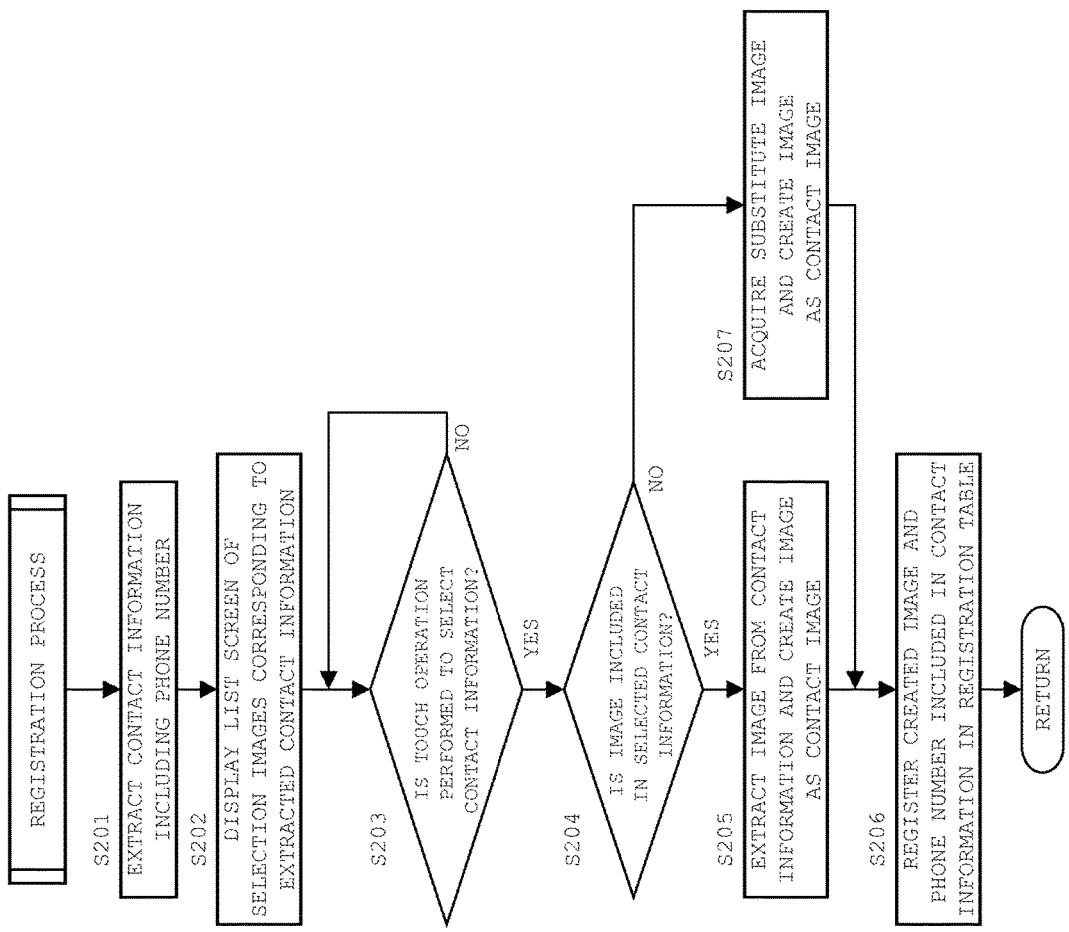
Figure 9B:
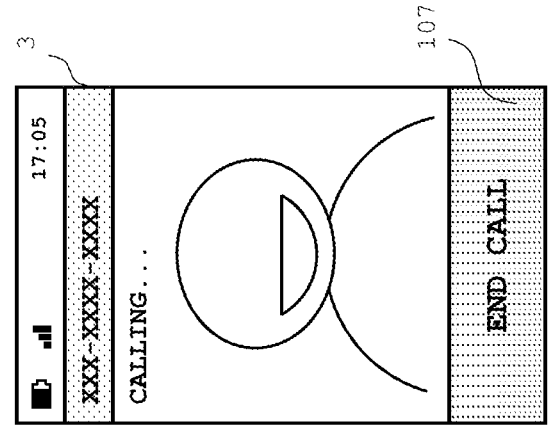
FIGS. 9A and 9B are illustrations of diagrams illustrating screen transition on the display surface when a calling operation is performed in the embodiment.
Figure 9A:
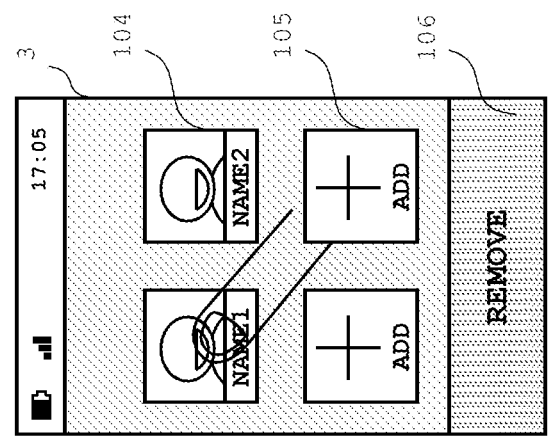

FIG. 6 is an illustration of a flowchart of control processes for the speed dialing function. FIGS. 7A and 7B are illustrations of flowcharts of a registration process and a removal process included in the control processes for the speed dialing function. FIGS. 8A to 8C are illustrations of diagrams for describing the speed dialing screen. FIGS. 9A and 9B are illustrations of diagrams illustrating screen transition on the display surface 3 when a calling operation is performed. FIGS. 10A to 10C are illustrations of diagrams illustrating screen transition on the display surface 3 when a registration operation is performed. FIGS. 11A to 11D are diagrams illustrating screen transition on the display surface 3 when a removal operation is performed.

At the start of the process, the control module 11 displays the speed dialing screen on the display surface 3 (S101). As illustrated in FIGS. 8A and 8B, the speed dialing screen includes a display region R1. As illustrated in FIG. 8A, the display region R1 has a plurality of display points, for example, four display points P1 to P4 aligned vertically and horizontally. As illustrated in FIG. 8B, the control module 11 displays contact images 104 or additional images 105 at the display points P1 to P4, according to the registration table 12b.

As illustrated in FIG. 8C, in the registration process, images as the contact images 104 and phone numbers associated with the images are registered in the registration table 12b in registration fields corresponding to the display points P1 to P4.

The control module 11 displays, on the speed dialing screen, the images registered in the registration table 12b as the contact images 104 at the display points corresponding to the registered images. The contact images 104 include names. The names are acquired from the contact information including phone numbers associated with the contact images 104. For example, the images composed of the photos and names of the communication partners corresponding to the associated phone numbers are displayed as the contact images 104 on the speed dialing screen. Each of the contact images 104 is operated by the user to make a call to the communication partner with the phone number associated with the contact image 104.

The control module 11 further displays the pre-determined additional images 105 at the display points with no images registered in the registration table 12b. The additional images 105 are not associated with phone numbers. The additional images 105 are displayed in a mode indicating that no contact information including phone numbers is associated. In the initial state, that is, in the state where no registration process has been executed, the registration table 12b has no image registered. In this case, the additional images 105 are displayed at all of the display points P1 to P4. Each of the additional images 105 is operated by the user to create a new contact image 104 associated with a phone number.

The speed dialing screen further includes a removal object 106. The removal object 106 is operated by the user to remove a contact image 104 from the speed dialing screen.

Upon display of the speed dialing screen (S101), the control module 11 monitors whether a touch operation has been performed with respect to any of the contact images 104, whether a touch operation has been performed with respect to any of the additional images 105, and whether a touch operation has been performed with respect to the removal object 106 (S102, S103, and S104).

When a touch operation is performed with respect to one of the contact images 104 (S102: YES) as illustrated in FIG. 9A, the control module 11 acquires the phone number associated with the contact image 104 from the registration table 12b (S105), and makes a call to the communication partner (mobile phone number or the like) at the acquired phone number (S106). When making a call, the control module 11 displays the calling screen on the display surface 3. As illustrated in FIG. 9B, the phone number and the image related to the communication partner stored in the phone book table 12a are displayed on the calling screen, for example. The calling screen also includes an end object 107. The end object 107 is operated by the user to stop the calling.

When the communication partner responds to the call or a touch operation is performed with respect to the end object 107 during the calling, the control module 11 ends the calling.

When a touch operation is performed with respect to the one of the additional images 105 (S103: YES) as illustrated in FIG. 10A, the control module 11 executes the registration process illustrated in FIG. 7A.

The control module 11 extracts contact information including phone numbers from the contact information registered in the phone book table 12a (S201). Next, the control module 11 creates selection images 108 corresponding to the extracted contact information, and displays a list screen of the created selection images 108 on the display surface 3 (S202). As illustrated in FIG. 10B, the plurality of selection images 108 is vertically arranged on the list screen in a list display region R2. In a case that all of the selection images 108 do not fall within the list display region R2, when a flick operation is performed upward or downward, the screen is scrolled to allow the selection images 108 having not been displayed to appear in the list display region R2.

Each of the selection images 108 includes an image and a name included in the contact information to allow the user to recognize which of the contact information corresponds to the selection image 108. When the contact information includes no image, the selection image 108 is provided with only a frame region in which an image can be displayed, for example.

The control module 11 determines whether a touch operation has been performed with respect to any of the selection images 108, that is, whether a touch operation has been performed to select contact information (S203).

The user performs a touch operation with respect to one of the selection images 108 for the contact information of which the phone number is to be registered in the speed dialing function. When a touch operation is performed with respect to the selection image 108 to select the contact information (S203: YES), the control module 11 determines whether the selected contact information includes an image (S204). When the selected contact information includes an image (S204: YES), the control module 11 extracts the image and creates an image as contact image 104 from the extracted image. For example, the control module 11 creates the image as contact image 104 by incorporating the name included in the contact information into the extracted image (S205). The control module 11 then registers the created image and the phone number included in the selected contact information in the registration table 12b to associate the image with the phone number (S206). At that time, the image as contact image 104 and the phone number are registered in the registration table 12b in a registration field corresponding to the display point at which the selected additional image 105 is displayed.

Upon completion of the registration process, the process returns to step S101. The control module 11 updates the display on the speed dialing screen according to the registration table 12b (S101). The control module 11 displays the contact image 104, instead of the additional image 105 having been displayed before the updating, at the display point corresponding to the image newly registered in the registration table 12b as illustrated in FIG. 10C.

In some cases, the selected contact information may include no image. In the embodiment, the storage module 12 stores a substitute image (image data) for use in the case where the contact information includes no image. When determining at step S204 that the selected contact information includes no image (S204: NO), the control module 11 acquires the substitute image from the storage module 12 and creates an image as contact image 104 from the acquired substitute image (S207). The control module 11 then registers the created image and the phone number included in the selected contact information in the registration table 12b (S206). Accordingly, upon the updating of the speed dialing screen, the contact image 104 created from the substitute image is displayed instead of the additional image 105.

Figure 11A:
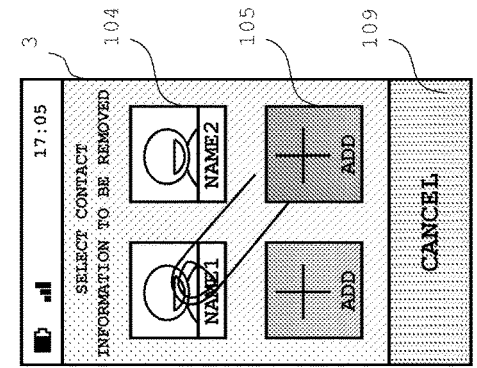
FIGS. 11A to 11D are illustrations of diagrams illustrating screen transition on the display surface when a removal operation is performed in the embodiment.

When a touch operation is performed with respect to the removal object 106 on the speed dialing screen as illustrated in FIG. 11A (S104: YES), the control module 11 performs the removal process illustrated in FIG. 7B. When there is no contact image 104 on the speed dialing screen, the touch operation with respect to the removal object 106 becomes invalid. Alternatively, when there is no contact image 104, the removal object 106 may be erased from the speed dialing screen.

Figure 11B:
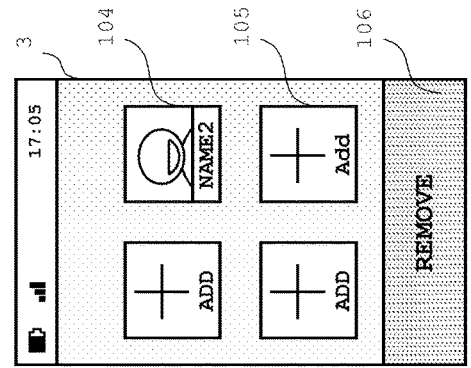

At the start of the removal process, the control module 11 displays a removal screen on the display surface 3 (S301). As illustrated in FIG. 11B, the contact images 104 and the additional images 105 are displayed on the removal screen. The additional images 105 appear more darkly than the additional images 105 displayed on the seed dialing screen, and a touch operation with respect to the additional images 105 becomes invalid.

The removal screen further includes a cancel object 109. The cancel object 109 is operated by the user to return the screen from the removal screen to the speed dialing screen.

The user performs a touch operation with respect to the contact image 104 to be removed on the removal screen. When determining that a touch operation has been performed with respect to the contact image (S302: YES), the control module 11 displays a confirmation screen on the display surface 3 (S303).

Figure 11C:
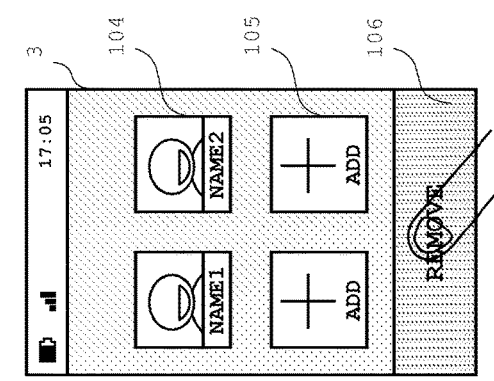

As illustrated in FIG. 11C, the confirmation screen includes a confirmation window 110 for prompting the user to perform an operation to confirm that the selected contact image 104 is to be removed. The confirmation window 110 includes an OK button 111 and a cancel button 112.

When determining that a touch operation has been performed with respect to the OK button 111 (S304: YES and S305: YES), the control module 11 removes the image and the phone number registered in the registration field corresponding to the display point for the selected contact image 104 in the registration table 12b.

Figure 11D:
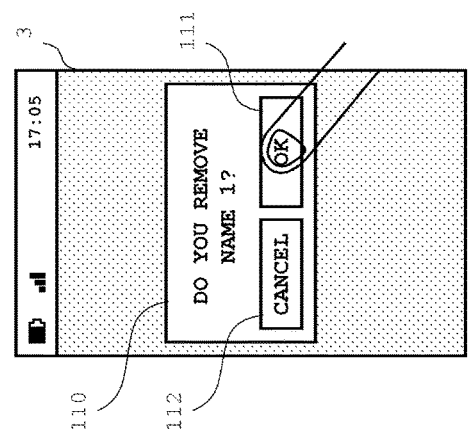

Upon completion of the removal process, the process returns to step S101. The control module 11 updates the display on the speed dialing screen according to the registration table 12b (S101). As illustrated in FIG. 11D, the control module 11 displays the additional image 105 instead of the contact image 104 selected on the removal screen.

When a touch operation is performed with respect to the cancel button 112 on the confirmation screen (S304: YES and S305: NO), the control module 11 returns the display on the display surface 3 from the confirmation screen to the removal screen (S301).

Even though the contact image 104 is removed from the speed dialing screen, the image and the phone number corresponding to the contact image 104 are not removed from the phone book table 12a.

According to the embodiment, performing a touch operation with respect to the contact image 104 makes a call to the communication partner at the phone number associated with the contact image 104. This allows the user to make a call to the communication partner at a specific phone number by the simple operation.

In addition, according to the embodiment, when a touch operation is performed with respect to the contact image 104, a call is made to the communication partner at the phone number associated with the contact image 104 without requiring the user to perform a further operation for making a call (such as a confirmation operation on the confirmation screen). This allows the user to make a call by the more simple operation.

Further, according to the embodiment, when a touch operation is performed with respect to the additional image 105, a registration process is executed to add a contact image 104 associated with a new phone number. Upon completion of the registration process, the additional image 105 is replaced with the new contact image 104. Accordingly, the user can make an additional registration of the contact image 104 associated with the new phone number by performing an operation of replacing the additional image 105 with the contact image 104. This operation for making an additional registration is easy to understand for the user.

Furthermore, according to the embodiment, at the start of entry of a phone number on the phone number entry screen, the calling object 102b is displayed, instead of the speed dialing object 102a, on the phone number entry screen. Accordingly, even though at least part of the phone number is entered and then the speed dialing object 102a is operated by mistake, the entered phone number is not deleted and the speed dialing is not executed.

Modification Example 1

Modification example 1 is different in the configuration of the speed dialing screen from the foregoing embodiment. In addition, the modification example 1 is also different in the removal process from the foregoing embodiment because of the difference in the configuration of the speed dialing screen.

Figure 12:
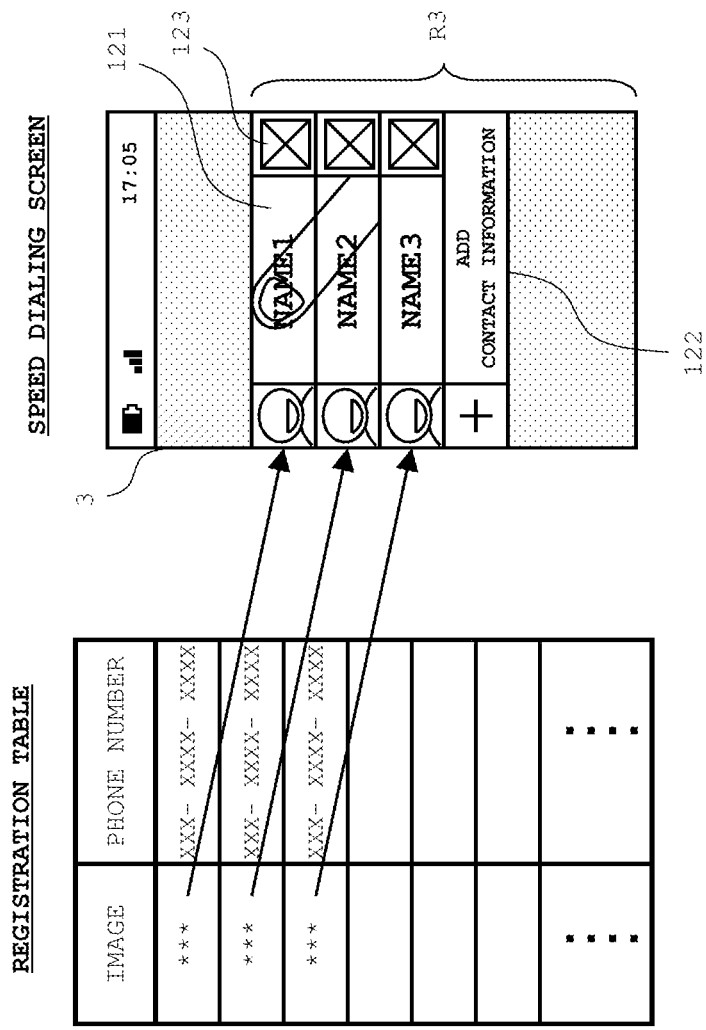
FIG. 12 is an illustration of a diagram for describing a speed dialing screen in a modification example 1.

FIG. 12 is an illustration of a diagram for describing the speed dialing screen in the modification example 1.

The registration table 12b in the modification example has registration fields corresponding to the number of phone numbers capable of being registered in the speed dialing function. Images as contact images 104 and phone numbers associated with the images are registered in the registration fields of the registration table 12b in the order of registration from the top downward. The registration fields with no image and phone number are blank.

As illustrated in FIG. 12, the control module 11 displays the images registered in the registration table 12b as contact images 121 in a display region R3 in the order of registration from the top downward. Each of the contact images 121 is composed of an image or a substitute image included in the contact information and a name included in the contact information, for example. The contact images 121 are vertically arranged and are formed in a rectangular shape.

The control module 11 also displays additional images 122 subsequent to the lastly displayed contact image 121. The additional image 122 includes text indicating that an addition of a phone number to the speed dialing function is enabled, for example.

The control module 11 further displays removal objects 123 corresponding to the contact images 121 next to the contact images 121.

As in the foregoing embodiment, when one of the contact images 121 is selected by a touch operation, the control module 11 makes a call to the communication partner at the phone number associated with the selected contact image 121.

FIGS. 13A to 13C are illustrations of diagrams illustrating screen transition on the display surface 3 when a registration operation is performed in the modification example 1. The steps for the registration process in the modification example 1 are the same as those for the registration process in the foregoing embodiment.

As illustrated in FIG. 13A, when a touch operation is performed with respect to the additional image 122, the control module 11 displays a list screen of selection images 108 on the display surface 3 as illustrated in FIG. 13B. When one of the selection images 108 is selected by a touch operation, the control module 11 registers the phone number included in the selected contact information and the image as contact image 121 associated with the phone number in the top blank registration field of the registration table 12b. As illustrated in FIG. 13C, to update the speed dialing screen, the control module 11 displays the newly registered image as contact image 121, instead of the additional image 122 having been displayed before the updating. The control module 11 further displays the additional image 122 subsequent to the newly displayed contact image 121.

Figure 14:
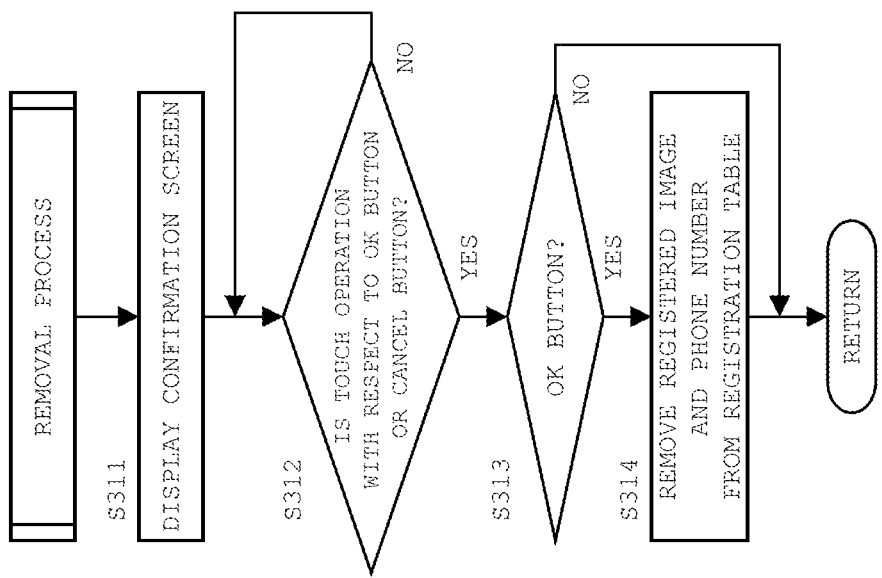
FIG. 14 is an illustration of a flowchart of a removal process in the modification example 1.

FIG. 14 is an illustration of a flowchart of a removal process in the modification example 1. FIGS. 15A to 15C are illustrations of diagrams illustrating screen transition on the display surface 3 when a removal operation is performed.

As illustrated in FIG. 15A, when a touch operation is performed with respect to the removal object 123 corresponding to any of the contact images 121 on the speed dialing screen, the removal process is executed. The control module 11 displays a confirmation screen on the display surface 3 as illustrated in FIG. 15B (S311). The confirmation screen is the same as the confirmation screen displayed on the display surface 3 by the removal process in the foregoing embodiment.

When determining that a touch operation has been performed with respect to the OK button 111 (S312: YES and S313: YES), the control module 11 removes the image corresponding to the selected removal object 123 and the phone number associated with the image from the registration table 12b. When any images and phone numbers are registered in the registration fields under the registration field from which the foregoing image and phone number are removed, the images and the phone numbers in the lower registration fields move upward in sequence.

As illustrated in FIG. 15C, to update the speed dialing screen, the control module 11 removes the contact image 121 corresponding to the selected removal object 123. When any contact images 121 exist under the deleted contact image 121, the lower contact images 121 move upward in sequence. The additional image 122 also moves upward.

When a touch operation is performed with respect to the cancel button 112 on the confirmation screen (S312: YES and S313: NO), the control module 11 returns the display on the display surface 3 from the confirmation screen to the speed dialing screen.

According to the modification example 1, the removal objects 123 are individually provided for the contact images 121, which eliminates the need for an operation of specifying the contact image 121 to be removed on the removal screen. This allows the user to easily perform an operation of removing the contact image 121, that is, an operation of clearing the registration of the phone number in the speed dialing function.

Modification Example 2

In a modification example 2, the storage module 12 stores an image table 12c illustrated in FIG. 16. The image table 12c has a plurality of substitute images according to age and gender. The image table 12c also has substitute images for persons whose age and gender are uncertain. The substitute images may be images related to communication partners such as face images or upper-body images.

In a registration process of the modification example 2, when no image is included in the contact information selected from the list screen, a substitute image is chosen from the image table 12c according to the contact information, and an image as contact image 104 is created from the selected substitute image.

Figure 17:
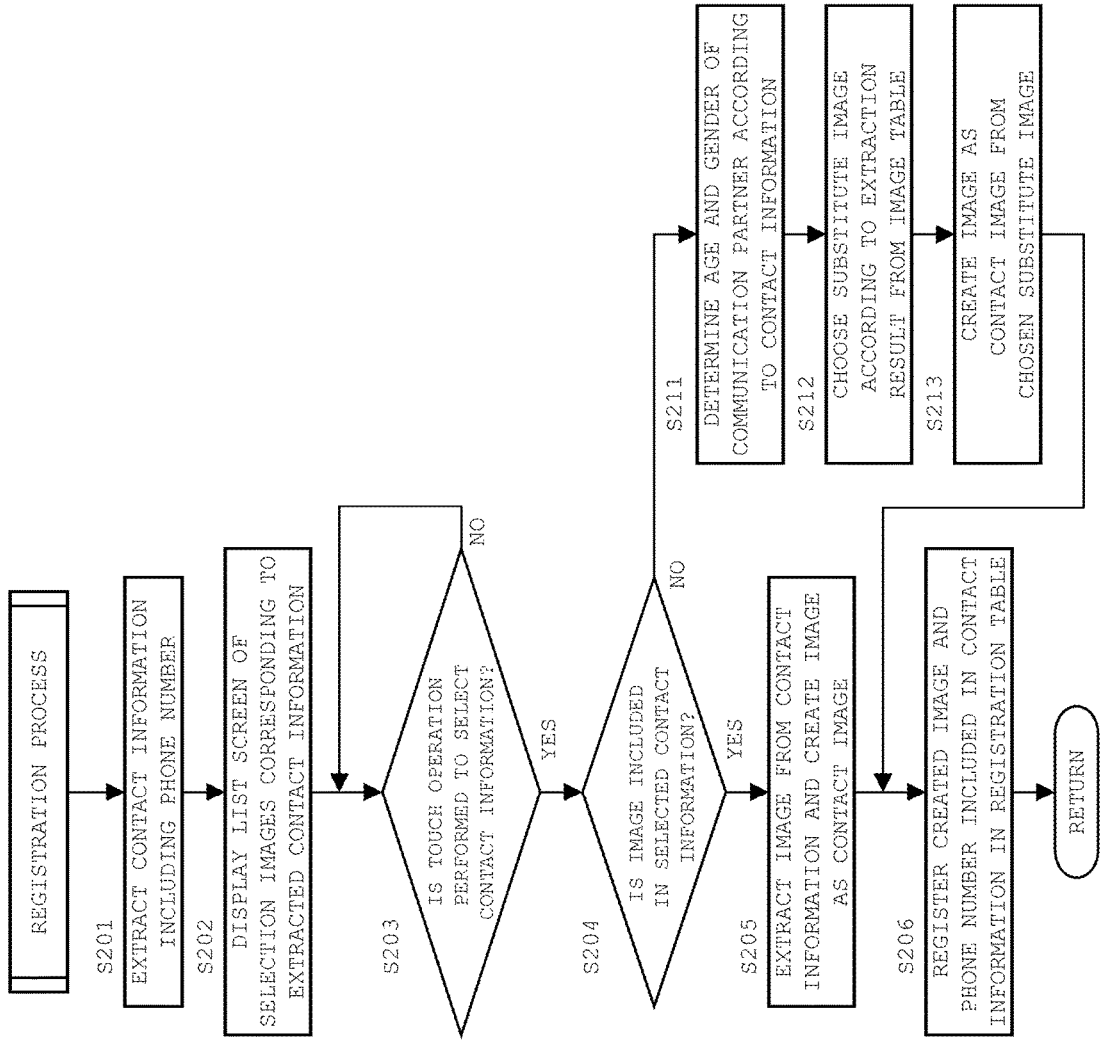
FIG. 17 is an illustration of a flowchart of a registration process in the modification example 2.

FIG. 17 is an illustration of a flowchart of the registration process in the modification example 2. In the modification example 2, steps S211 to S213 replace step S207 in the registration process of FIG. 7A.

The registration process in the modification example 2 will be described below. The same steps as the steps in the foregoing embodiment will be given the same step numbers as the step numbers in the foregoing embodiment, and descriptions of the steps will be omitted.

When determining at step S204 that the selected contact information includes no image (S204: NO), the control module 11 then determines the age and gender of the communication partner corresponding to the contact information, according to the selected contact information (S211). Specifically, the control module 11 determines the age from the birthday included in the contact information. The control module 11 also determines the gender from the name included in the contact information. For example, the storage module 12 stores a name database with a large number of names sorted by gender. The control module 11 searches the name database for the same name as the name included in the contact information to determine the gender of the person with the name (S211).

The control module 11 chooses a substitute image corresponding to the determined age and gender from the image table 12c (S212). That is, when the age and the gender can be determined, the control module 11 chooses the substitute image for the age group including the age and the gender. When the gender can be determined but the age cannot, the control module 11 chooses the substitute image for a man or woman of uncertain age. When the gender cannot be determined, the control module 11 chooses the substitute image for a person of gender undetermined regardless of whether the age can be determined.

The control module 11 creates an image as contact image 104 from the chosen substitute image (S213). The control module 11 then registers the created image and the phone number included in the selected contact information in the registration table 12b (S206).

Accordingly, the speed dialing screen displays the contact information, in the foregoing example, the contact image 104 created from the substitute image chosen according to the age and gender of the communication partner.

According to the modification example 2, the contact image 104 can be created from the substitute image chosen according to the contact information. This allows the user to determine easily the communication partner corresponding to the contact image 104 from the displayed contact image 104, as compared to the case where the contact image 104 is created from a substitute image (one substitute image) unrelated to the contact information.

In the foregoing example, the image table 12c has a plurality of substitute images according to age and gender. Alternatively, the image table 12c may have a plurality of substitute images according to other conditions, for example, occupation, hobby, address, or the like.

Modification Example 3

FIGS. 18A to 18C are illustrations of diagrams for describing a control process in the speed dialing function in a modification example 3.

In the modification example 3, the storage module 12 stores an emergency contact table 12d as illustrated in FIG. 18A. The emergency contact table 12d includes emergency contact names and emergency contact phone numbers for individual emergency contacts. The emergency contact table 12d also includes images dedicated for emergency contacts. On registration of an emergency contact phone number in the speed dialing function, one of the dedicated images constitutes a contact image 141 associated with the emergency contact phone number. Each of the dedicated images is composed of an image of an emergency contact and an emergency contact name.

When the additional image 105 is selected on the speed dialing screen, the control module 11 displays selection images 108 corresponding to the contact images 104 and selection images 142 corresponding to emergency contacts on the list screen as illustrated in FIG. 18B. Each of the selection images 142 is composed of an image indicating an emergency contact and an emergency contact name, for example. When one of the selection images 142 is selected by a touch operation, the control module 11 acquires the emergency contact phone number and the dedicated image corresponding to the selected selection image 142 from the emergency contact table 12d, and registers the acquired emergency contact phone number and the dedicated image in the registration table 12b.

As illustrated in FIG. 18C, to update the speed dialing screen, the control module 11 displays the newly registered dedicated image as contact image 141, instead of the additional image 105 having been displayed before the updating.

According to the modification example 3, it is possible to make an emergency call to an emergency contact by the simple call operation of touching the contact image 141 associated with the emergency contact phone number.

Modification Example 4

Figure 19A:
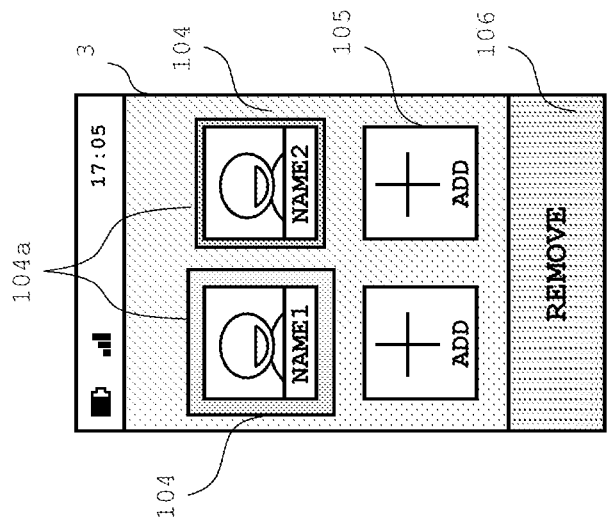
FIGS. 19A to 19C are illustrations of diagrams for describing a control process in a speed dialing function in a modification example 4.
Figure 19B:
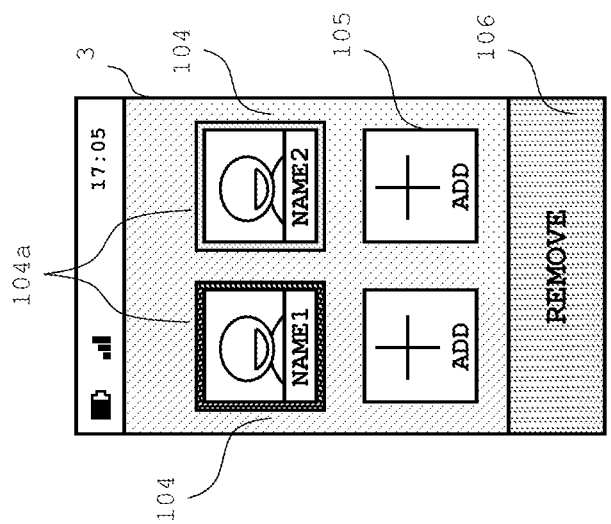
Figure 19C:
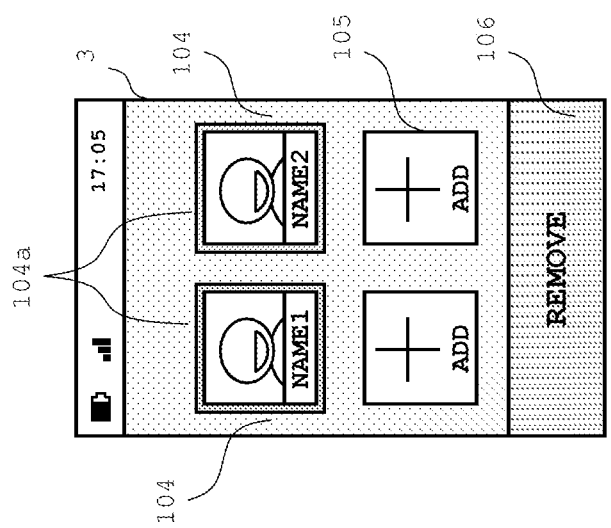

FIGS. 19A to 19C are illustrations of diagrams for describing a control process in a speed dialing function in a modification example 4.

In the modification example 4, the display mode of the contact image 104 is changed according to the number of calls made to the communication partner at a phone number associated with the contact image 104 or the duration of the calls with the communication partner.

As illustrated in FIG. 19A, for example, a frame 104a is formed around each of the contact images 104. Each time a touch operation is performed with respect to the contact image 104 to make a call at a phone number associated with the contact image 104, the control module 11 records the number of calls made to the communication partner and the duration of the calls. When the number of the calls exceeds a predetermined number of times or the total duration of the calls exceeds a predetermined period of time, the control module 11 changes the color of the frame 104a of the contact image 104 associated with the applicable phone number as illustrated in FIG. 19B.

Instead of changing the color of the frame 104a, the control module 11 may change the thickness of the frame 104a as illustrated in FIG. 19C.

The change in the display mode of the contact image 104 is not limited to the change in the frame 104a. For example, the shape, size, or brightness of the contact image 104 may be changed instead.

According to the modification example 4, the user can check the display modes of the contact images 104 to easily recognize communication partners to which calls are made with high frequencies.

Modification Example 5

Figure 20:
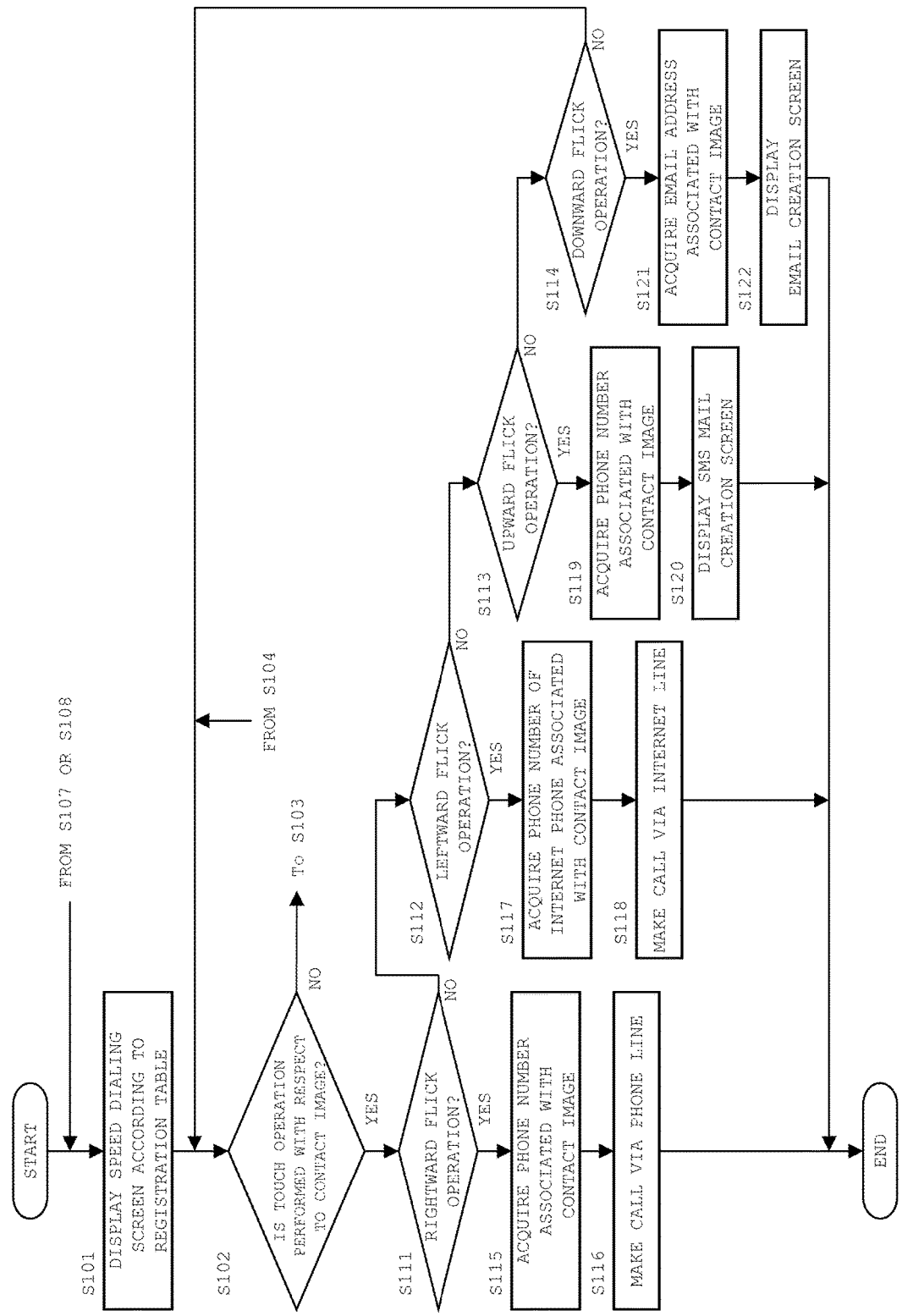
FIG. 20 is an illustration of a flowchart describing a control process in a speed dialing function in a modification example 5.

FIG. 20 is an illustration of a flowchart describing a control process in a speed dialing function in a modification example 5. FIG. 20 represents only some steps including steps (S111 to S122) added to the control process in the speed dialing function in the foregoing embodiment (refer to FIG. 6).

In the modification example 5, a flick operation with respect to the contact image 104 is accepted on the speed dialing screen. According to the direction of the flick operation, a process for making a call to a general phone, a process for making a call to an internet phone, a process for displaying an SMS (Short Message Service) mail creation screen, or a process for displaying an email creation screen is executed.

Each of the contact images 104 is associated with a phone number (general phone number), an internet phone number, and an email address. The internet phone number is included in contact information registered in the phone book table 12a. When the contact information is selected in the registration process, the control module 11 registers the image as contact image 104, the phone number, the internet phone number, and the email address in the registration table 12b.

A control process in the speed dialing function in the modification example 5 will be described below. The same steps as the steps in the foregoing embodiment will be given the same step numbers as the step numbers in the foregoing embodiment, and descriptions of the steps will be omitted.

When a touch operation is performed with respect to the contact image 104 at step S102, the control module 11 determines whether the touch operation is a flick operation in the right direction, whether a flick operation in the left direction, whether a flick operation in the upward direction, and whether a flick operation in the downward direction (S111, S112, S113, and S114).

When determining that a flick operation has been performed in the right direction (S111: YES), the control module 11 acquires the phone number associated with the contact image 104 from the registration table 12b (S115), and makes a call to the communication partner at the acquired phone number via a phone line (S116). When determining that a flick operation has been performed in the left direction (S112: YES), the control module 11 acquires the internet phone number associated with the contact image 104 from the registration table 12b (S117), and makes a call to the communication partner at the acquired phone number via an internet line (S118).

When determining that a flick operation has been performed in the upward direction (S113: YES), the control module 11 acquires the phone number associated with the contact image 104 from the registration table 12b (S119), and displays an SMS mail creation screen on the display surface 3 (S120). At that time, the control module 11 enters the acquired phone number into the address field of the mail creation screen. When determining that a flick operation has been performed in the downward direction (S114: YES), the control module 11 acquires the email address associated with the contact image 104 from the registration table 12b (S121), and displays an email creation screen on the display surface 3 (S122). At that time, the control module 11 enters the acquired email address into the address field of the email creation screen.

According to the modification example 5, performing a touch operation with respect to the contact image 104 makes it possible to execute not only the process for making a call to a general phone but also the other processes using the contact information, thereby bringing about enhancement in user convenience.

The mobile phone may be further configured to execute one of the four processes, that is, the process for making a call to a general phone, the process for making a call to an internet phone, the process for displaying an SMS mail creation screen, and the process for displaying an email creation screen according to the direction of a flick operation as described above, as illustrated in FIGS. 21A and 21B.

Figure 21A:
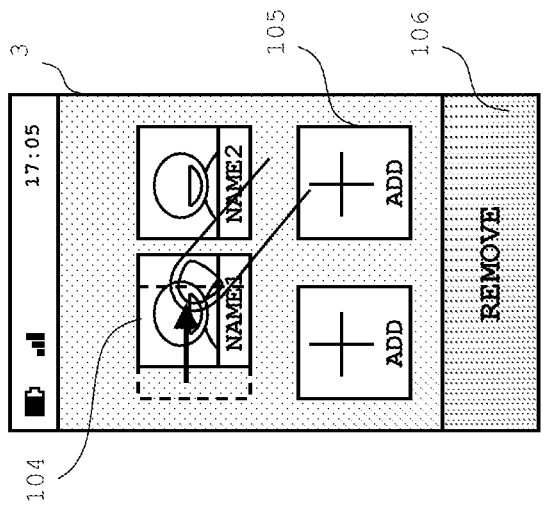
FIGS. 21A and 21B are illustrations of diagrams illustrating a speed dialing screen in the modification example 5.

In the configuration of FIG. 21A, when a tap operation or a log-tap operation is performed with respect to one of the contact images 104 prior to a flick operation, the control module 11 displays a guide icon group 131 that guides the user to the process to be executed according to the direction of the flick operation on the contact image 104. The guide icon group 131 disappears after display for a specific time. The guide icon group 131 includes a guide icon 132a corresponding to the process for making a call to a general phone, which is disposed at the right side with respect of the center of the contact image 104, a guide icon 132b corresponding to the process for making a call to an internet phone, which is disposed at the left side with respect of the center of the contact image 104, a guide icon 132c corresponding to the process for displaying an SMS mail creation screen, which is disposed at the upper side with respect of the center of the contact image 104, and a guide icon 132d corresponding to the process of displaying an email creation screen, which is disposed at the lower side with respect of the center of the contact image 104. Alternatively, the control module 11 may display the guide icon group 131 after a specific time has elapsed since the display of the speed dialing screen, even though a tap operation or a log-tap operation is not performed.

This configuration allows the user to easily understand the executable processes according to the direction of a flick operation.

Figure 21B:
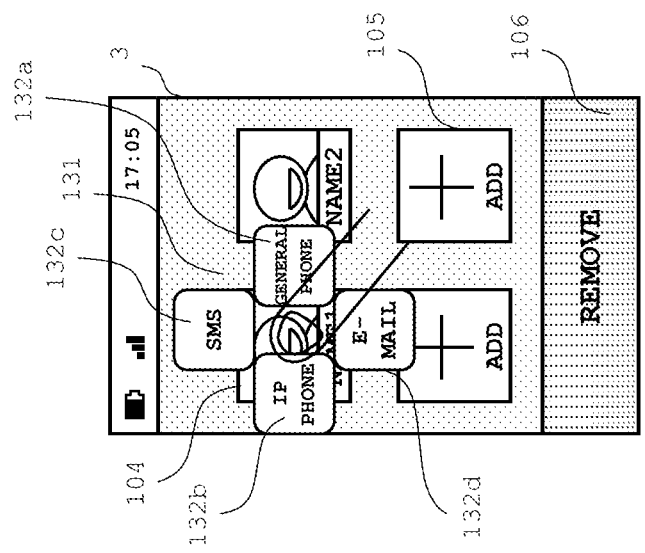

In the configuration of FIG. 21B, when a flick operation is performed with respect to the contact image 104, the control module 11 moves the contact image 104 to the direction of the flick operation.

This configuration allows the user to easily determine whether the flick operation has been performed correctly to the desired direction.

Modification Example 6

Figure 22:
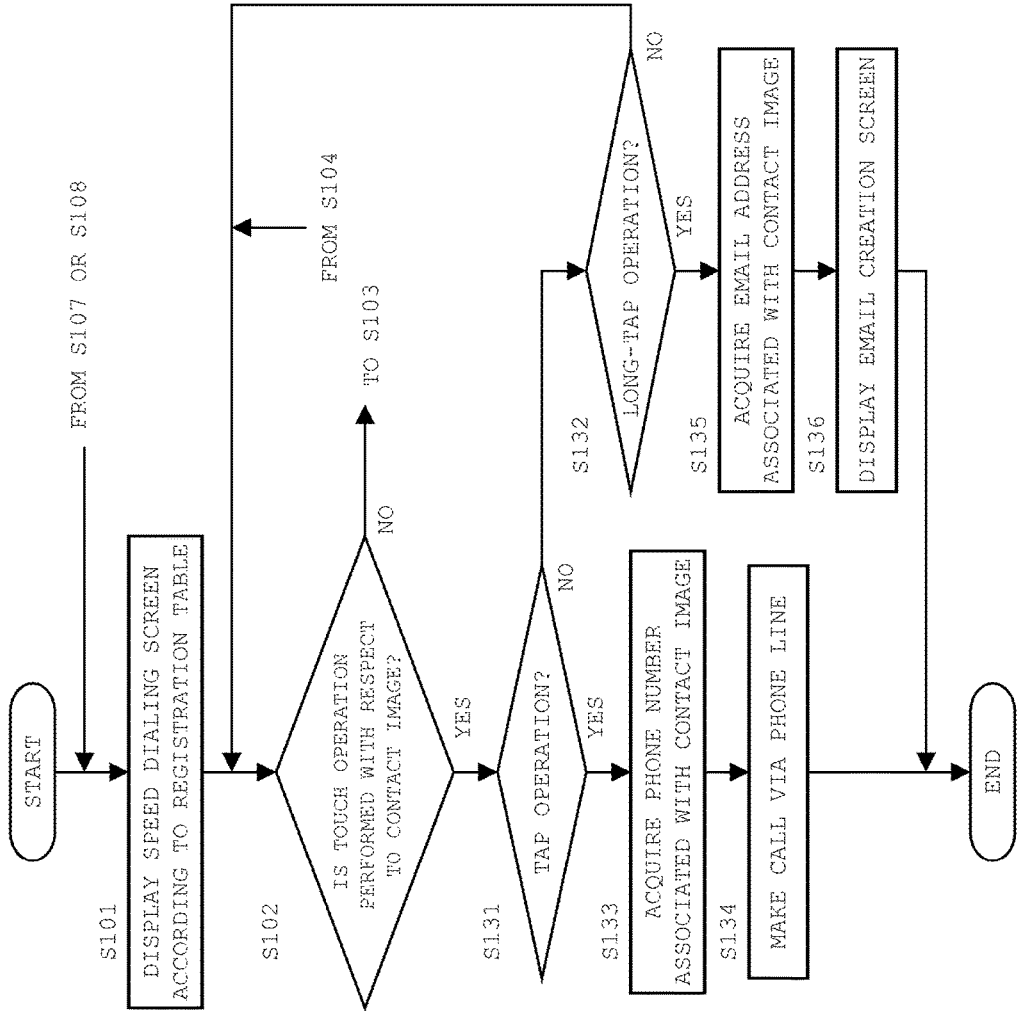
FIG. 22 is an illustration of a flowchart of a control process in a speed dialing function in a modification example 6.

FIG. 22 is an illustration of a flowchart of a control process in a speed dialing function in a modification example 6. FIG. 22 represents only some steps including steps (S131 to S136) added to the control process in the speed dialing function in the foregoing embodiment (refer to FIG. 6).

In the modification example 6, a tap operation and a log-tap operation with respect to the contact image 104 is accepted on the speed dialing screen, a process for making a call to a general phone is executed according to the tap operation, and a process for displaying an email creation screen is executed according to the long-tap operation.

Each of the contact images 104 is associated with a phone number (phone number of a general phone) and an email address. When contact information is selected in the registration process, the control module 11 registers the image as contact image 104, the phone number, and the email address in the registration table 12b.

The control process in the speed dialing function in the modification example 6 will be described below. The same steps as those in the foregoing embodiment will be given the same step numbers as the step numbers in the foregoing embodiment, and descriptions the steps will be omitted.

When a touch operation with respect to the contact image 104 is performed at step S102, the control module 11 determines whether the touch operation is a tap operation and whether the touch operation is a log-tap operation (S131 and S132).

When determining that a tap operation has been performed (S131: YES), the control module 11 acquires the phone number associated with the contact image 104 from the registration table 12b (S133), and makes a call to the communication partner at the acquired phone number via a phone line (S134). When determining that a long-tap operation has been performed (S132: YES), the control module 11 acquires the email address associated with the contact image 104 from the registration table 12b (S135), and displays an email creation screen on the display surface 3 (S136). At that time, the control module 11 enters the acquired email address in the address field of the email creation screen.

When no email address is registered in the registration table 12b, the control module 11 may display a new email creation screen with no email address entered. Otherwise, the control module 11 may invalidate the process for displaying an email creation screen. Alternatively, the control module 11 may invalidate the process for displaying an email creation screen and make a notification that no email address is registered on the display module 13.

According to the modification example 6, performing a touch operation with respect to the contact image 104 makes it possible to execute not only the process for making a call to a general phone but also the other processes using the contact information, thereby bringing about enhancement in user convenience.

Modification Example 7

Figure 23:
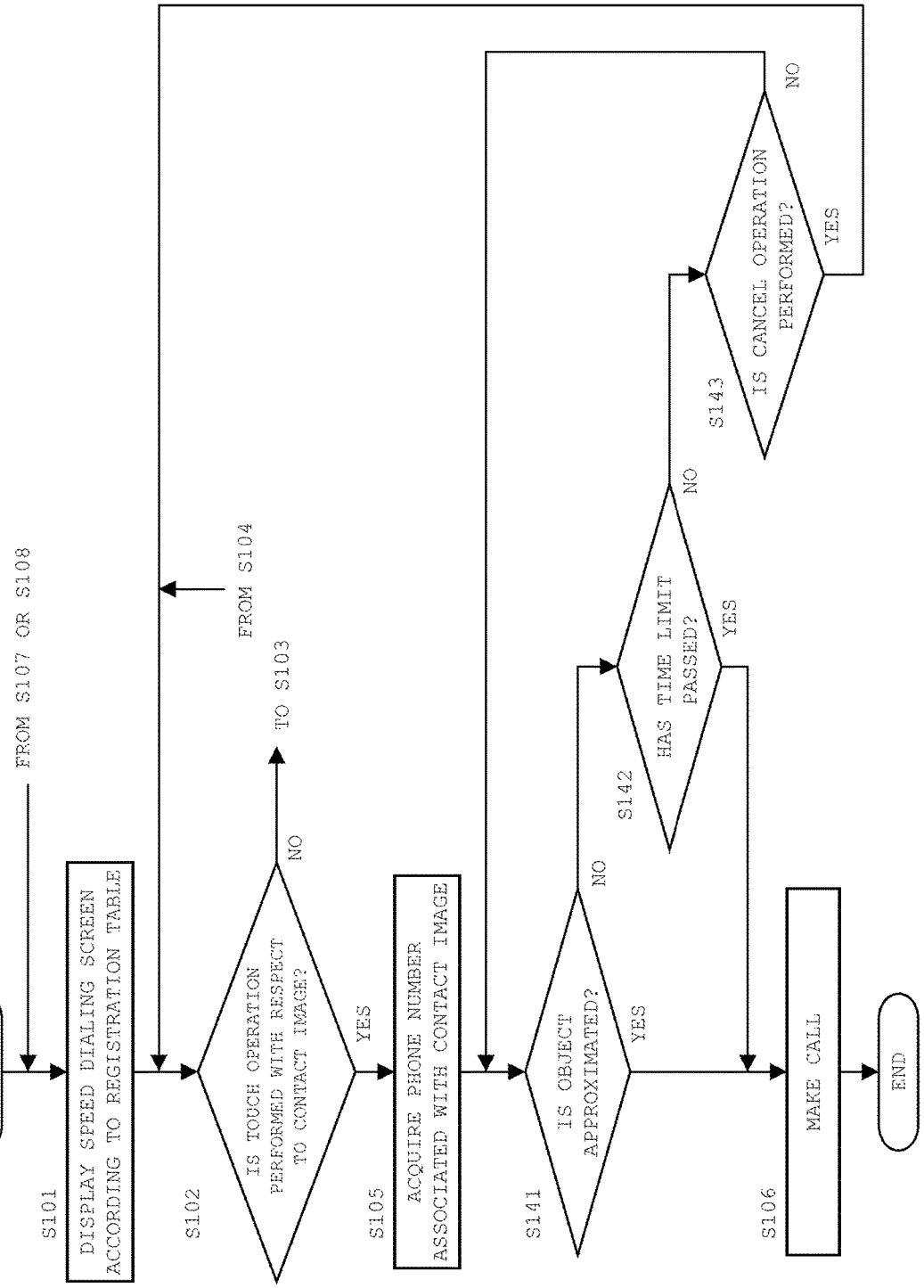
FIG. 23 is an illustration of a flowchart of a control process in a speed dialing function in a modification example 7.

FIG. 23 is an illustration of a flowchart of a control process in a speed dialing function in a modification example 7. FIG. 23 represents only some steps including steps (S141 to S143) added to the control process in the speed dialing function in the foregoing embodiment (refer to FIG. 6).

In the modification example 7, a call is made not immediately after a touch operation is performed with respect to the contact image 104 on the speed dialing screen, but when the mobile phone 1 is approximated to the user's ear. That is, a call is made when the user starts the act of making a call.

The control process in the speed dialing function in the modification example 7 will be described below. The same steps as the steps in the foregoing embodiment will be given the same step numbers as the step numbers in the foregoing embodiment, and descriptions of the steps will be omitted.

When a touch operation is performed with respect to the contact image 104, the control module 11 acquires the phone number associated with the contact image 104 from the registration table 12b (S105). The control module 11 then determines whether the mobile phone 1 is approximated to an object, that is, the user's ear or cheek according to the result of the detection by the proximity detection module 20 (S141). When determining that the mobile phone 1 is approximated to the user's ear or the like (S141: YES), the control module 11 makes a call to the communication partner at the acquired phone number (S106).

Meanwhile, when determining that the mobile phone 1 is not approximated to the user's ear or the like (S141: NO), the control module 11 then determines whether an operation of cancelling the call has been performed within a time limit (for example, about ten to several tens of seconds) (S142 and S143).

When the user has performed by mistake a touch operation with respect to the contact image 104, the user performs immediately an operation of cancelling the call, for example, a touch operation again with respect to the contact image 104. When the cancel operation has been performed within the time limit (S142: NO and S143: YES), the control module 11 makes no call and monitors again whether a touch operation again has been performed with respect to the contact image 104 (S102). When the time limit has passed without the cancel operation (S142: YES), the control module 11 makes a call (S106).

According to the modification example, it is possible to prevent that a call is made by the user's incorrect operation.

Modification Example 8

Figure 24:
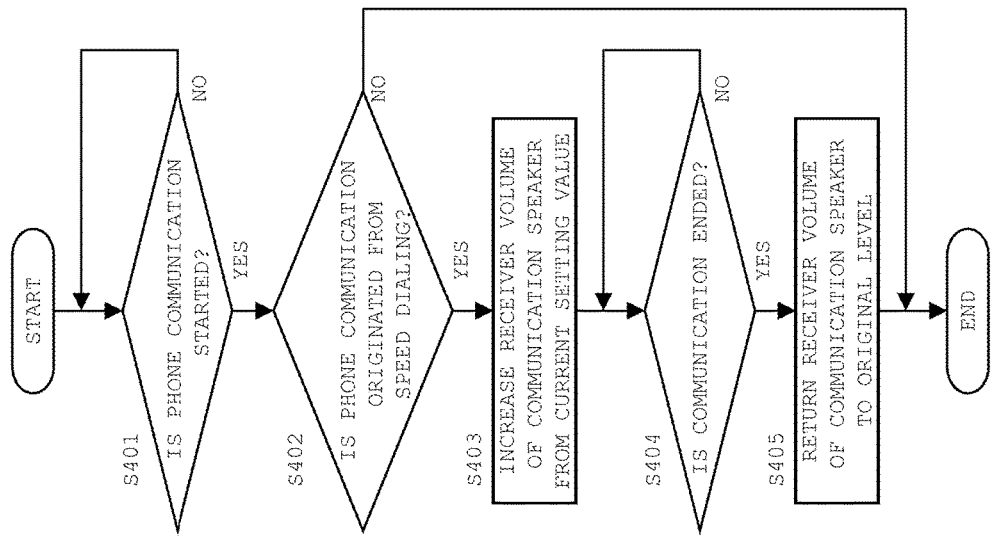
FIG. 24 is an illustration of a flowchart of an adjustment process for receiver volume in a modification example 8.

FIG. 24 is an illustration of a flowchart of an adjustment process for receiver volume in a modification example 8.

In the modification example 8, when a call is made in the speed dialing function and a phone communication is started, the receiver volume of the call speaker 5 is set to be higher than normal receiver volume. The process for adjusting the receiver volume in the modification example 8 will be described below.

When a phone communication is started (S401: YES), the control module 11 determines whether the phone communication is originated from making a call in the speed dialing function (S402). When the phone communication is originated from making a call in the speed dialing function (S402: YES), the control module 11 increases the receiver volume of the call speaker 5 from the current setting value. Accordingly, the receiver volume of the call speaker 5 becomes higher than the receiver volume in normal phone communications (for example, a phone communication originated from receiving a call from the communication partner and a phone communication originated from making a call through direct entry of a phone number).

Upon termination of the phone communication (S404: YES), the control module 11 returns the receiver volume of the call speaker 5 to the original level (S405).

According to the modification example 8, the user can hold a phone communication favorably with a communication partner registered in the speed dialing function.

Modification Example 9

In a modification example 9, a calling announcement process is executed to announce that a call is made in the speed dialing function.

Figure 25:
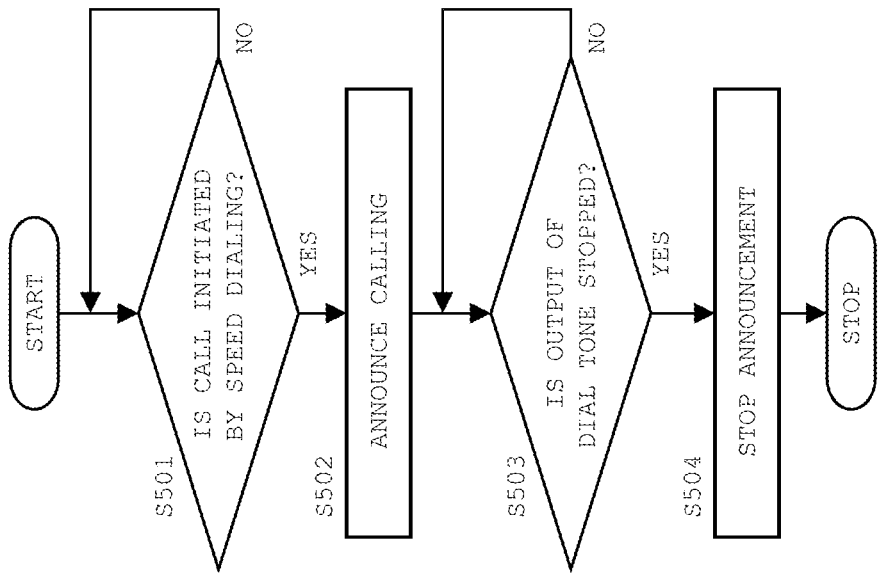
FIG. 25 is an illustration of a flowchart of a call announcement process in a modification example 9.

FIG. 25 is an illustration of a flowchart of the call announcement process in the modification example 9. The call announcement process in the modification example 9 will be described below.

As described above, when a touch operation is performed with respect to the contact image 104, a call is initiated to the communication partner at the phone number associated with the contact image 104. At the start of the call, a dial tone is output from the communication module 19 to the communication partner. When the call has been initiated in the speed dialing function (S501: YES), a beep or sound is output from the external speaker 7 to announce the calling to the outside (S502).

When the communication partner responds to the call or disconnects the communication, the output of the dial tone is stopped. When the output of the dial tone is stopped (S503: YES), the control module 11 stops the announcement (S504).

The calling may be announced not only by a beep or sound from the external speaker 7 but also vibration of a vibrator provided in the mobile phone 1, for example.

According to the modification example 9, even though the user touches the contact image 104 by mistake to make a call unintentionally, he/she can realize the incorrect calling by the announcement and stop the calling.

Others

As in the foregoing, the embodiment and the modification examples are described. However, the disclosure is not limited by the foregoing embodiment and others. The embodiment can be modified in various ways other than the foregoing ones.

Figure 26:
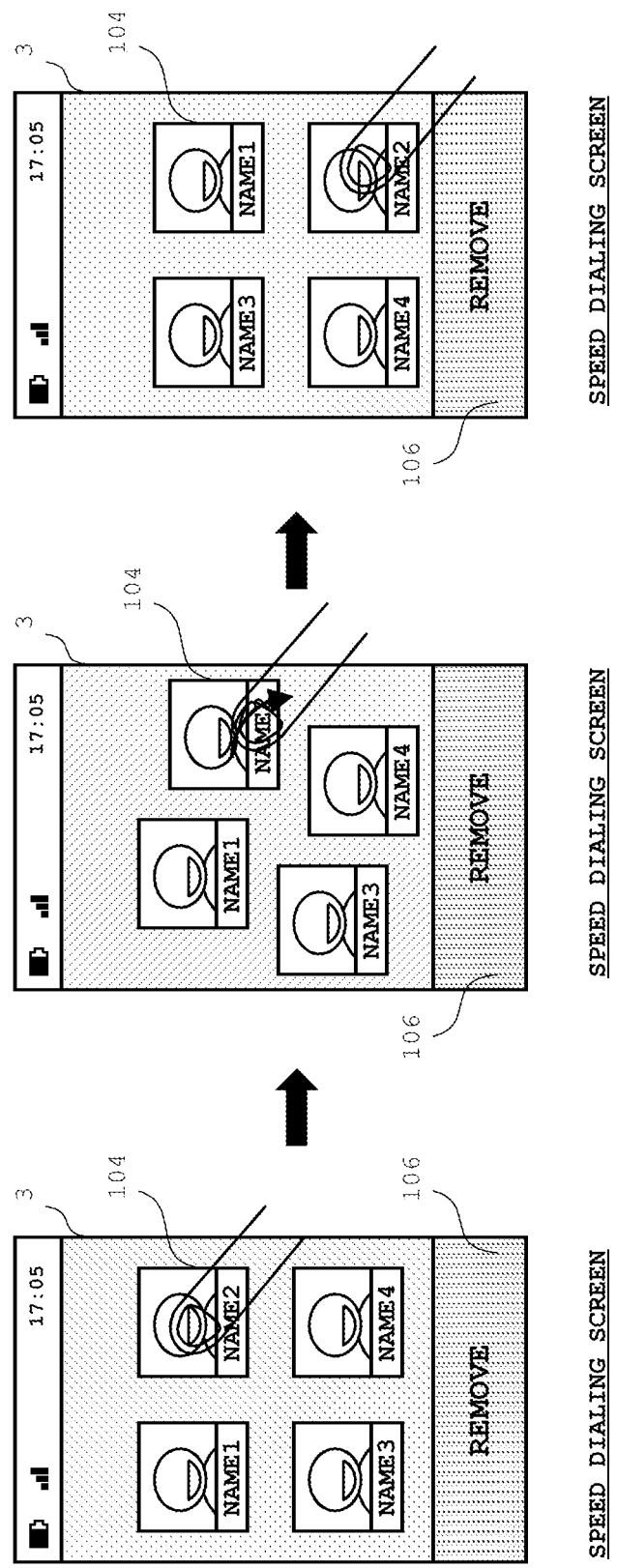
FIG. 26 is an illustration of a diagram illustrating a speed dialing screen in another modification example.

For example, in the foregoing embodiment, the position of the contact image 104 on the speed dialing screen may be changed by a drag operation with respect to the contact image 104. When four contact images 104 are arranged on the speed dialing screen, each of the contact images 104 can be moved as in the example of FIG. 26, for instance. In the example of FIG. 26, when a drag operation is performed to move the contact image 104 at the upper right toward the contact image 104 at the lower right, the contact image 104 at the lower right moves to the left side, the contact image 104 at the lower left moves to the upper side, and the contact image 104 at the upper left moves to the right side. Consequently, each of the contact images 104 moves clockwise to the next position. In reverse, when a drag operation is performed to move the contact image 104 at the upper right toward the contact image 104 at the upper left, each of the contact images 104 moves counterclockwise to the next position. As another example, when a drag operation is performed to move one contact image 104 toward another contact image 104, the positions of these contact images 104 may be exchanged.

In addition, in the foregoing embodiment, acceptance regions R4, which accept a touch operation with respect to the contact images 104 and the additional images 105 as illustrated in FIG. 27, may be set in a wider area than the contact images 104 and the additional images 105. In this case, even though a touch operation is performed on a position slightly shifted from the contact image 104, a call can be made at the phone number associated with the contact image 104. In addition, even though a touch operation is performed on a position slightly shifted from the additional image 105, a registration process can be executed.

Further, in the foregoing embodiment, when no image is included in the contact information selected from the list screen, an image is created as contact image 104 from a substitute image. Alternatively, after the creation of the contact image 104 from the substitute image as described above, when the image is registered in the phone book table 12*a* to add the image to the contact information corresponding to the contact image 104, a new image may be created from the added image and displayed as contact image 104 instead of the image created from the substitute image.

Furthermore, in the foregoing embodiment, the content of the contact image 104 may be updated on a regular basis. When an image is included in the contact information selected from the list screen, a new image is created as contact image 104 from that image and is registered in the registration table 12*b*. Accordingly, the content of the contact image 104 can be updated on a regular basis by reading another image from the storage place (folder) of the image included in the contact information, that is, another image related to the communication partner with the contact information on a regular basis, then creating an image as contact image 104 from the read image, and then registering the created image in the registration table 12*b*.

In addition, in the foregoing embodiment, the size of the contact image 104 may be changed by user operation. In this case, when the size of one contact image 104 is changed, the remaining contact images 104 may also be changed in size accordingly. For example, when the size of one contact image 104 is increased to make it difficult to display the remaining contact images 104 in the original size, the remaining contact images 104 are decreased in size.

Further, in the foregoing embodiment, the output destination of the receiver sound may be set from among a plurality of sound output destinations (the call speaker 5, the external speaker 7, a wireless speaker wirelessly connected to the mobile phone 1, and the like) for each of the contact images 104 on the speed dialing screen. In this case, when a phone communication is conducted with the communication partner at the phone number associated with the contact image 104, the receiver sound is output from the output destination corresponding to the contact image 104. This allows the user to select the desired output destination of receiver sound according to the communication partner.

For example, as illustrated in FIG. 28A, when any of the selection images 108 is selected from the list screen, the control module 11 displays an output destination selection screen. The output destination selection screen displays a plurality of output destination objects 151 indicating output destinations. When any of the output destination objects 151, that is, any of the output destinations is selected by the user's touch operation, the control module 11 associates the selected output destination with the contact image 104 corresponding to the selection image 108 selected from the list screen. Accordingly, the output destination associated with the contact image 104 is set as the output destination of receiver sound during a phone communication originated from an operation performed with respect to the contact image 104.

Further, in the foregoing embodiment, receiver sound may be output from the output destination set in advance by the user (the call speaker 5, the external speaker 7, a wireless speaker, or the like) during a phone communication originated from making a call in the speed dialing function. This allows the user to select the desired output destination of receiver sound during a phone communication originated from making a call in the speed dialing function.

For example, the control module 11 displays an output selection screen as illustrated in FIG. 28B on the display surface 3 according to a predetermined operation. The output destination selection screen is the same as the output destination selection screen in FIG. 28A. When any of the output objects 151, that is, any of the output destinations is selected by the user's touch operation, the control module 11 sets the selected output destination as the output destination of receiver sound during a phone communication originated from making a call in the speed dialing function.

Further, in the foregoing embodiment, the contact images 104 are not limited to still images but may be moving images.

Furthermore, in the foregoing embodiment, the contact information including phone numbers are stored in the storage module 12 of the mobile phone 1. Alternatively, the contact information including phone numbers may be stored in an external storage module such as a server. In that case, the server sends contact information to the mobile phone 1 in response to a request for transmission of the contact information from the mobile phone 1. The mobile phone 1 can receive the contact information from the server to acquire the desired contact information.

The configurations in the foregoing modification examples 1 to 9 can be combined as appropriate.

The disclosure is not limited to a mobile phone, but may be applied to various kinds of mobile terminal devices such as a PDA (Personal Digital Assistant), a tablet PC, and an electronic book terminal.

The embodiment of the disclosure may be changed or modified in various ways as necessary within the technical scope of the claims of the disclosure hereinafter defined.

What is claimed is:

1. A mobile terminal device, comprising:
memory configured to store contact information for a plurality of contacts;
a display having a display surface;
a touch panel configured to detect an operation with respect to the display surface; and
at least one processor configured to
display a screen comprising a first image and a second image, wherein the first image represents a first one of the plurality of contacts, and the second image represents a placeholder for adding a representation of a new one of the plurality of contacts to the screen, when an operation for selecting the first image is detected, initiate a call to a first phone number included in first contact information for the first contact, when an operation for selecting the second image is detected, initiate selection of a second one of the plurality of contacts that is associated with second contact information, and, when an operation for selecting the second contact is detected, replace the second image in the screen with a third image representing the selected second contact.

2. The mobile terminal device according to claim 1, wherein the operation for selecting the first image comprises a single touch-and-release operation, and wherein the call to the first phone number is initiated without requiring the user to perform any further operation.

3. The mobile terminal device according to claim 1, wherein the memory stores a plurality of predefined candidate images, and wherein the at least one processor, when the second contact information is not associated with a contact image for the second contact, selects one of the plurality of predefined candidate images to be used as the third image based on the second contact information.

4. The mobile terminal device according to claim 1, wherein the memory stores a fourth image that indicates an emergency contact, and wherein the at least one processor is further configured to:

when an operation for specifying a phone number as an emergency contact is detected, update the screen to comprise the fourth image; and when an operation for selecting the fourth image is detected, initiate a call to the phone number specified as the emergency contact.

5. The mobile terminal device according to claim 1, wherein the at least one processor is further configured to visually distinguish the first image from the third image based on a difference between a number or duration of calls to the first contact and a number or duration of calls to the second contact.

6. The mobile terminal device according to claim 1, wherein the at least one processor is configured to respond to each of a plurality of different operations for selecting the first image with a respective one of a plurality of different processes, wherein initiating the call to the first phone number is a first one of the plurality of different processes that is a response to a first one of the plurality of different operations, and wherein the at least one processor is further configured to response to a second one of the plurality of different operations with a second one of the plurality of different processes that is different than the first process of initiating the call to the first phone number.

7. The mobile terminal device according to claim 6, wherein the first operation is an operation of touching the first image and moving a touch position in a first direction, wherein the second operation is an operation of touching the first image and moving a touch position in a second direction that is different from the first direction, and wherein at least one processor is further configured to display information that indicates directions, including the first direction and second direction, for all of the plurality of different operations, including the first operation and the second operation.

8. The mobile terminal device according to claim 1, further comprising a proximity detector configured to detect proximity of an object to the mobile terminal device, wherein the at least one processor is configured to, when the operation for selecting the first image is detected, delay a start of the call until the proximity of an object is detected.

9. The mobile terminal device according to claim 1, wherein the at least one processor, when a call is initiated by the operation for selecting the first image via the screen, starts the call with a higher receiver volume than a receiver volume of a call initiated via a different screen.

10. The mobile terminal device according to claim 1, wherein the at least one processor activates an announcement when the call to the first phone number is initiated by the operation for selecting the first image via the screen.

11. The mobile terminal device according to claim 1, further comprising a plurality of sound outputs, wherein the at least one processor is further configured to, when the call to the first phone number is initiated by the operation for selecting the first image via the screen, selects one of the plurality of sound outputs as an output destination during, wherein the selected sound output is different than a sound output selected when a call to the first number is initiated via a different screen.

12. The mobile terminal device according to claim 1, wherein the at least one processor is further configured to:

display a phone number entry screen, that is different than the screen comprising the first image and the second image, and having a first operation region for entry of a phone number and a second operation region for performing an operation to display the screen comprising the first image and the second image;

when an operation to the second operation region is detected, display the screen comprising the first image and the second image, instead of the phone number entry screen; and, when an operation of entering a phone number in the first operation region is detected, replace the second operation region on the phone number entry screen with a third operation region for initiating a call to the phone number entered in the first operation region.

13. A non-transitory computer readable storage medium comprising computer-executable instructions for operating a mobile terminal device that includes: a memory configured to store contact information for a plurality of contacts, and a display having a display surface, wherein the computer-executable instructions comprise:

displaying a screen comprising a first image and a second image, wherein the first image represents a first one of the plurality of contacts, and the second image represents a placeholder for adding a representation of a new one of the plurality of contacts to the screen;

when an operation for selecting the first image is detected, initiating a call to a first phone number included in first contact information for the first contact;

when an operation for selecting the second image is detected, initiating selection of a second one of the plurality of contacts that is associated with second contact information; and when an operation for selecting the second contact is detected, replacing the second image in the screen with a third image representing the selected second contact.

14. A control method for a mobile terminal device that includes: a memory configured to store contact information for a plurality of contacts, and a display having a display surface, wherein the control method comprises:

displaying a screen comprising a first image and a second image, wherein the first image represents a first one of the plurality of contacts, and the second image represents a placeholder for adding a representation of a new one of the plurality of contacts to the screen;

when an operation for selecting the first image is detected, initiating a call to a first phone number included in first contact information for the first contact;

when an operation for selecting the second image is detected, initiating selection of a second one of the plurality of contacts that is associated with second contact information; and when an operation for selecting the second contact is detected, replacing the second image in the screen with a third image representing the selected second contact.

* * * * *